US006992977B2

(12) United States Patent
Tamura et al.

(10) Patent No.: US 6,992,977 B2
(45) Date of Patent: Jan. 31, 2006

(54) TRANSMISSION APPARATUS AND A METHOD FOR TRANSMITTING DATA IN A DATA TRANSMISSION SYSTEM

(75) Inventors: Nobuyuki Tamura, Yokohama (JP); Hiroaki Nagao, Kawasaki (JP); Sotohiro Kobayashi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 993 days.

(21) Appl. No.: 10/036,278

(22) Filed: Nov. 7, 2001

(65) Prior Publication Data

US 2002/0141340 A1 Oct. 3, 2002

(30) Foreign Application Priority Data

Mar. 30, 2001 (JP) ............................. 2001-101997

(51) Int. Cl.
 *H04L 1/00* (2006.01)
(52) U.S. Cl. ...................... 370/227; 370/228; 370/243; 370/244
(58) Field of Classification Search ................. 370/228
 See application file for complete search history.

(56) References Cited

U.S. PATENT DOCUMENTS 4,071,700 A * 1/1978 Huffman et al. ............ 370/228
4,393,493 A * 7/1983 Edwards ..................... 370/228
4,463,350 A * 7/1984 Kajiura et al. ......... 340/825.01
5,937,029 A * 8/1999 Yosef ........................ 379/9.05
6,324,161 B1 * 11/2001 Kirch ......................... 370/217
6,553,508 B1 * 4/2003 Minyard ........................ 714/4
2003/0133417 A1* 7/2003 Badt, Jr. ..................... 370/254

* cited by examiner

*Primary Examiner*—Chau Nguyen
*Assistant Examiner*—Anthony Sol
(74) *Attorney, Agent, or Firm*—Katten Muchin Rosenman LLP

(57) ABSTRACT

A transmission apparatus includes a reception line selecting unit, a communication confirming frame transmitting unit, a communication confirming table, and a reception line deciding unit. The reception line selecting unit selects one of several reception lines each formed by the synchronous network. The frame transmitting unit transmits a communication confirming frame to the synchronous network at least at a predetermined period. The communication confirming table stores each reception time of the communication confirming frame received through the synchronous network. The deciding unit decides occurrence of failure on the reception line corresponding to the reception time when a difference between a reception time stored in the table and a present time at the predetermined period exceeds a predetermined value, and transmits instructions for switching the reception line to the reception line selecting unit.

5 Claims, 37 Drawing Sheets

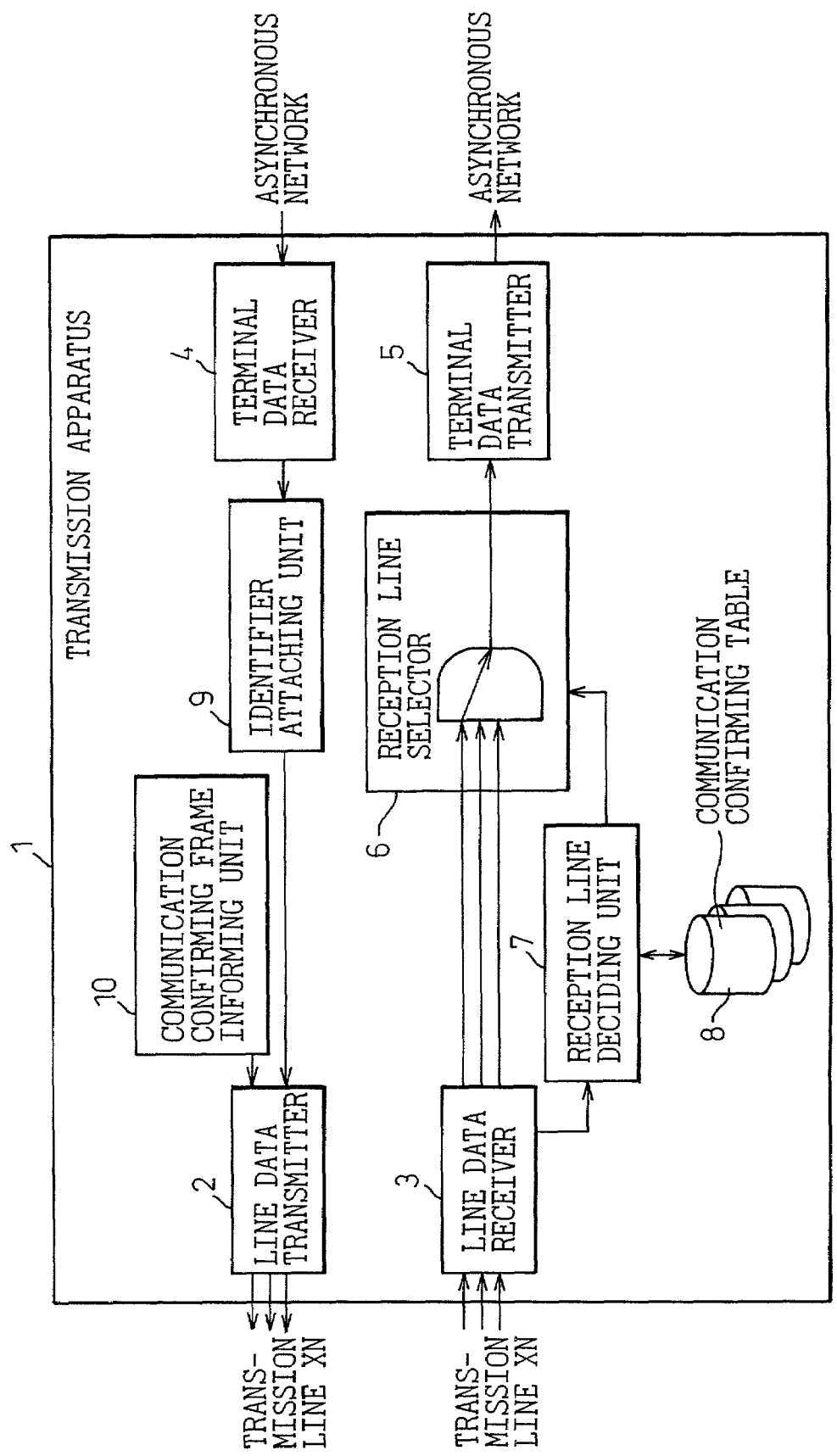

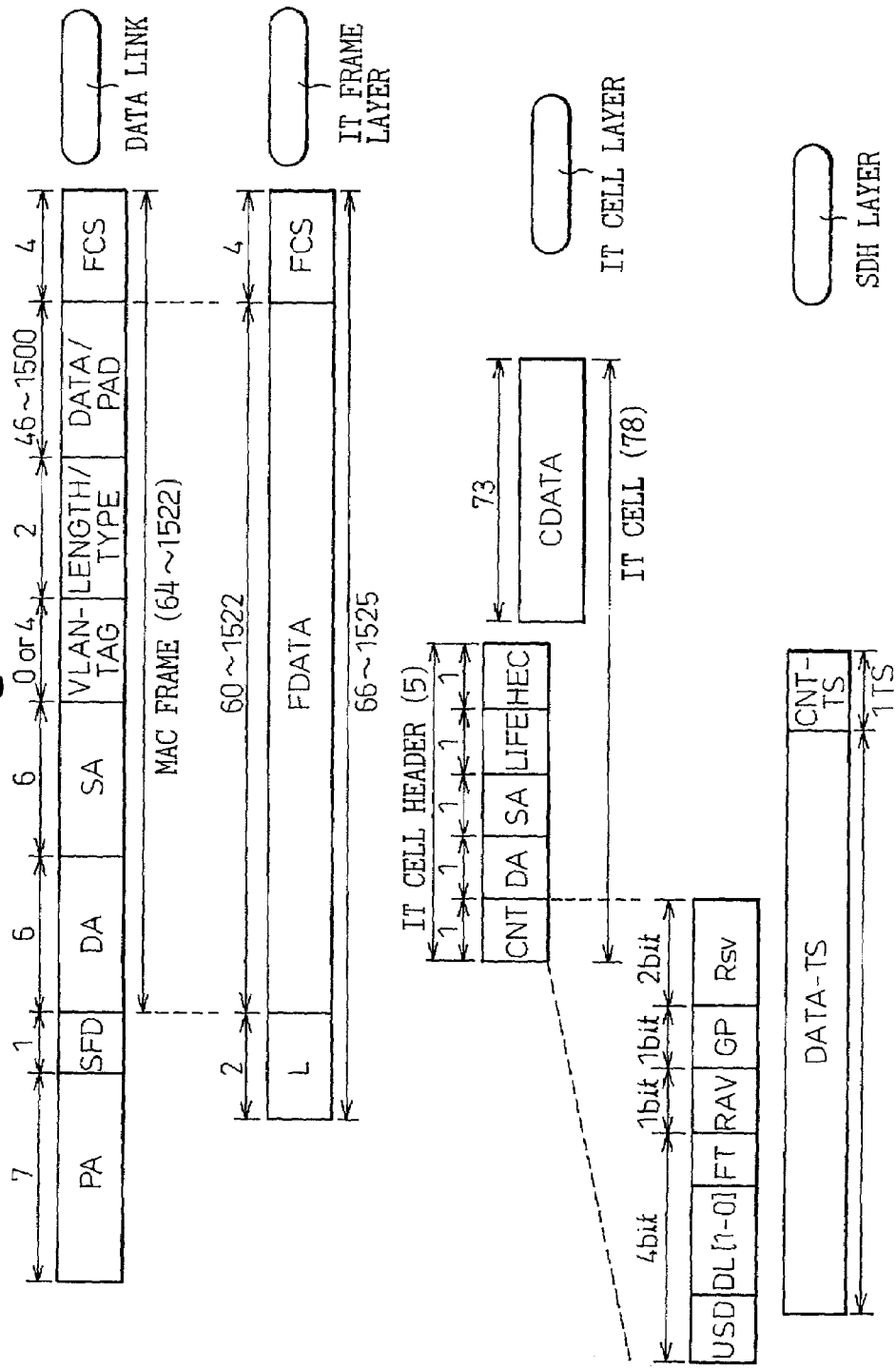

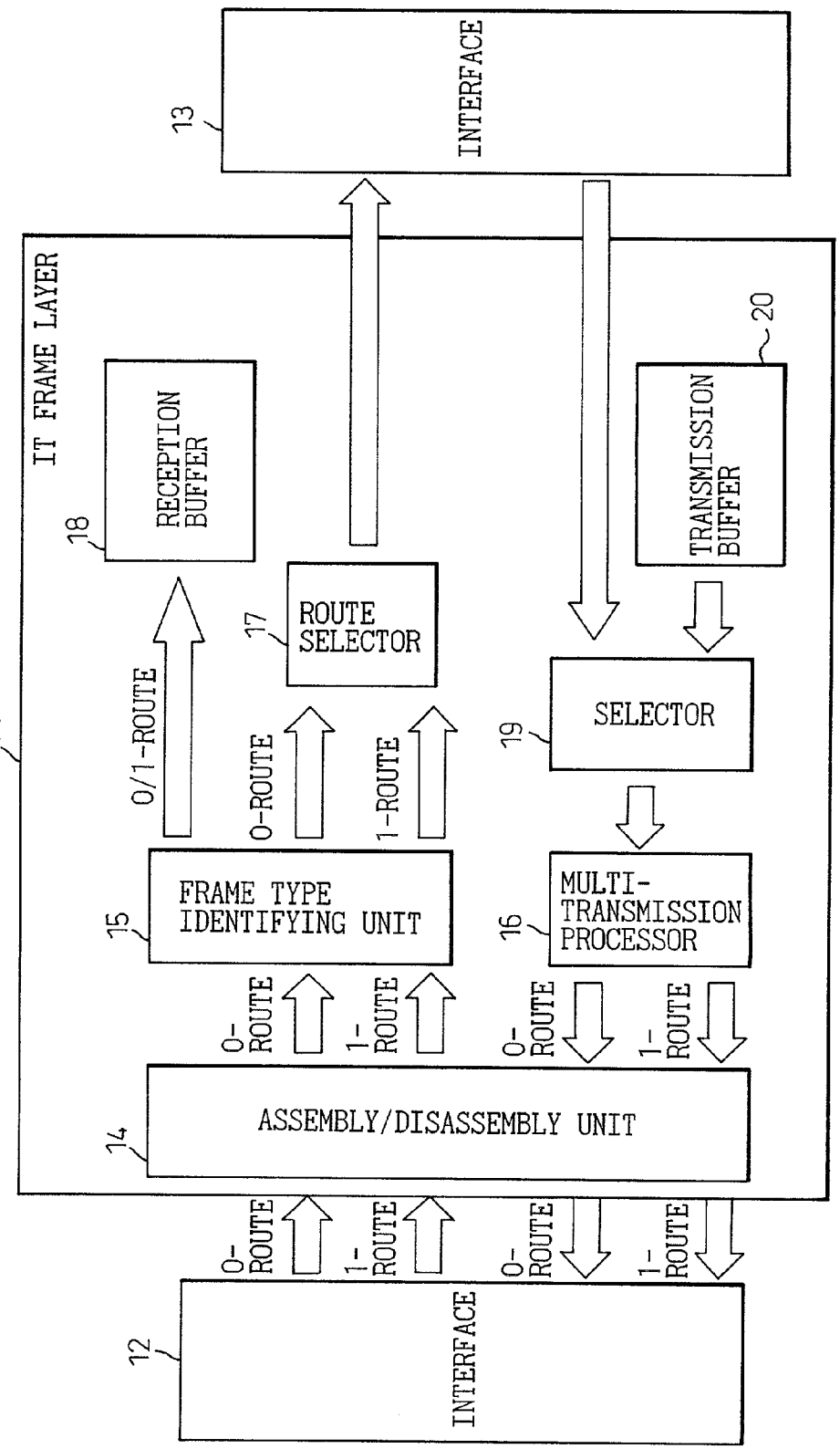

Fig.4

COMMUNICATION
CONFIRMING TABLE

| TRANSMISSION APPARATUS 1 COMMUNICATION MANAGING INFORMATION |
| TRANSMISSION APPARATUS 2 COMMUNICATION MANAGING INFORMATION |
| TRANSMISSION APPARATUS 3 COMMUNICATION MANAGING INFORMATION |
| ⋮ |
| TRANSMISSION APPARATUS n COMMUNICATION MANAGING INFORMATION |

| TRANSMISSION APPARATUS IDENTIFYING NUMBER |
| TRANSMISSION LINE 1 COMMUNICATION CONFIRMING FRAME RECEPTION TIME |
| TRANSMISSION LINE 2 COMMUNICATION CONFIRMING FRAME RECEPTION TIME |
| ⋮ |
| TRANSMISSION LINE n COMMUNICATION CONFIRMING FRAME RECEPTION TIME |

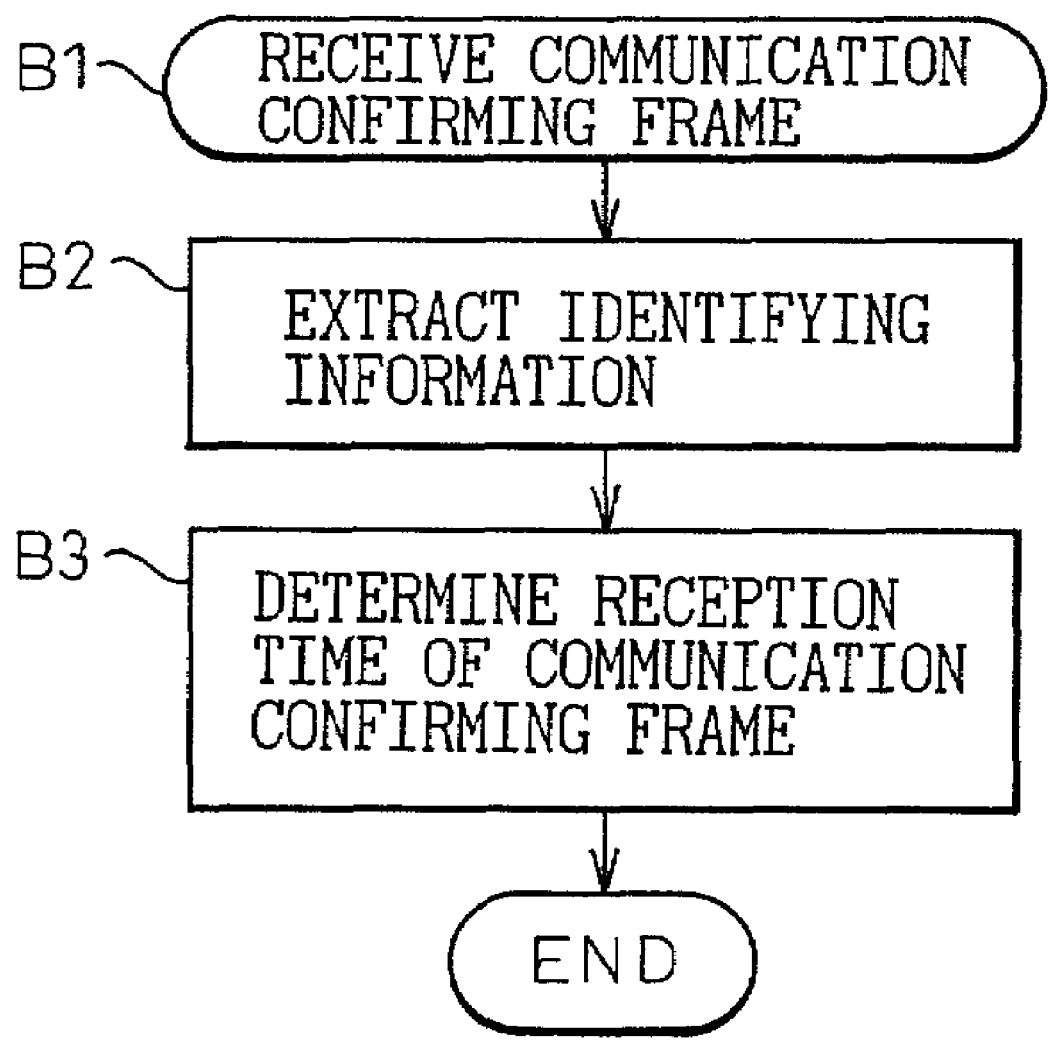

Fig.21A

TRANSMISSION FRAME SEQUENCE NUMBER

Fig.21B

| TRANSMISSION APPARATUS #1 RECEPTION FRAME SEQUENCE NUMBER |
|---|
| TRANSMISSION APPARATUS #2 RECEPTION FRAME SEQUENCE NUMBER |
| ⋮ |
| TRANSMISSION APPARATUS #n RECEPTION FRAME SEQUENCE NUMBER |

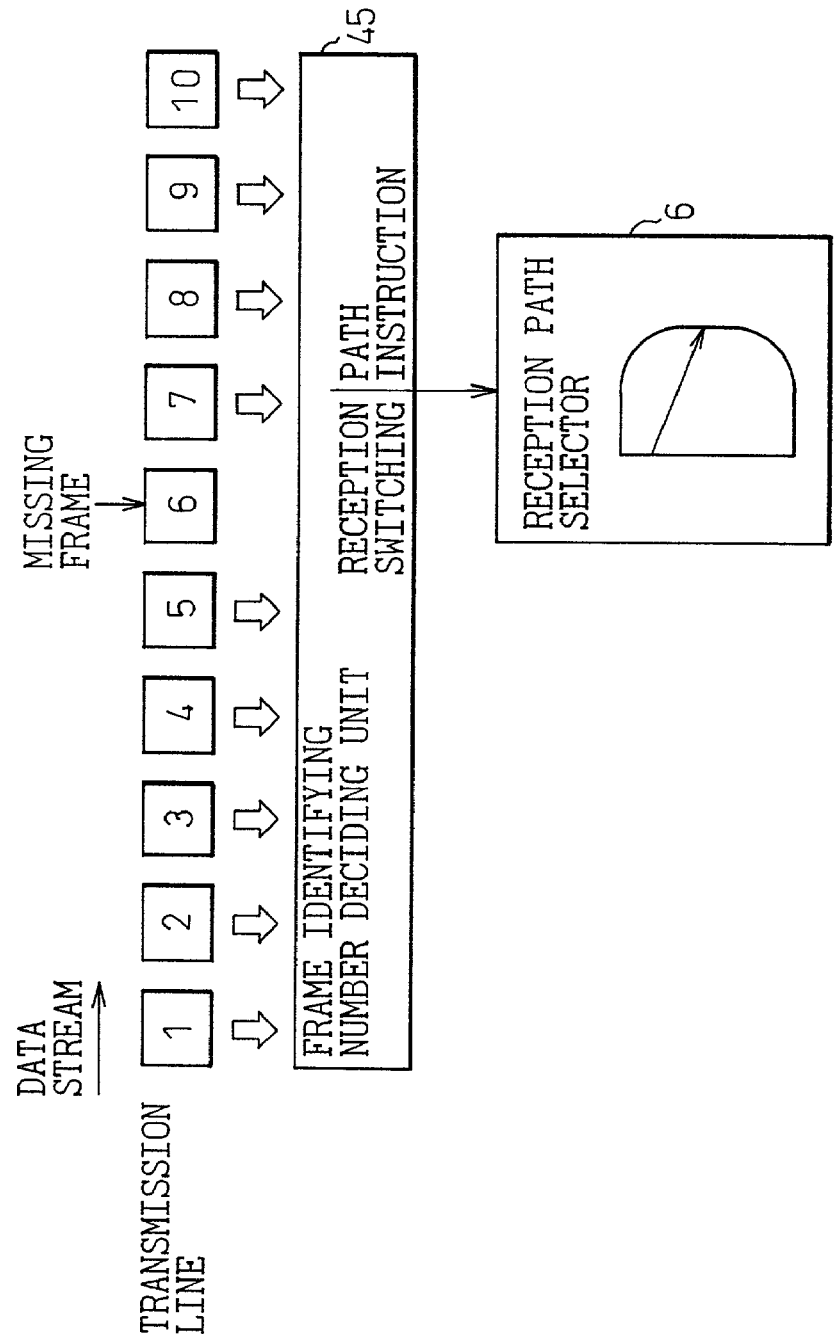

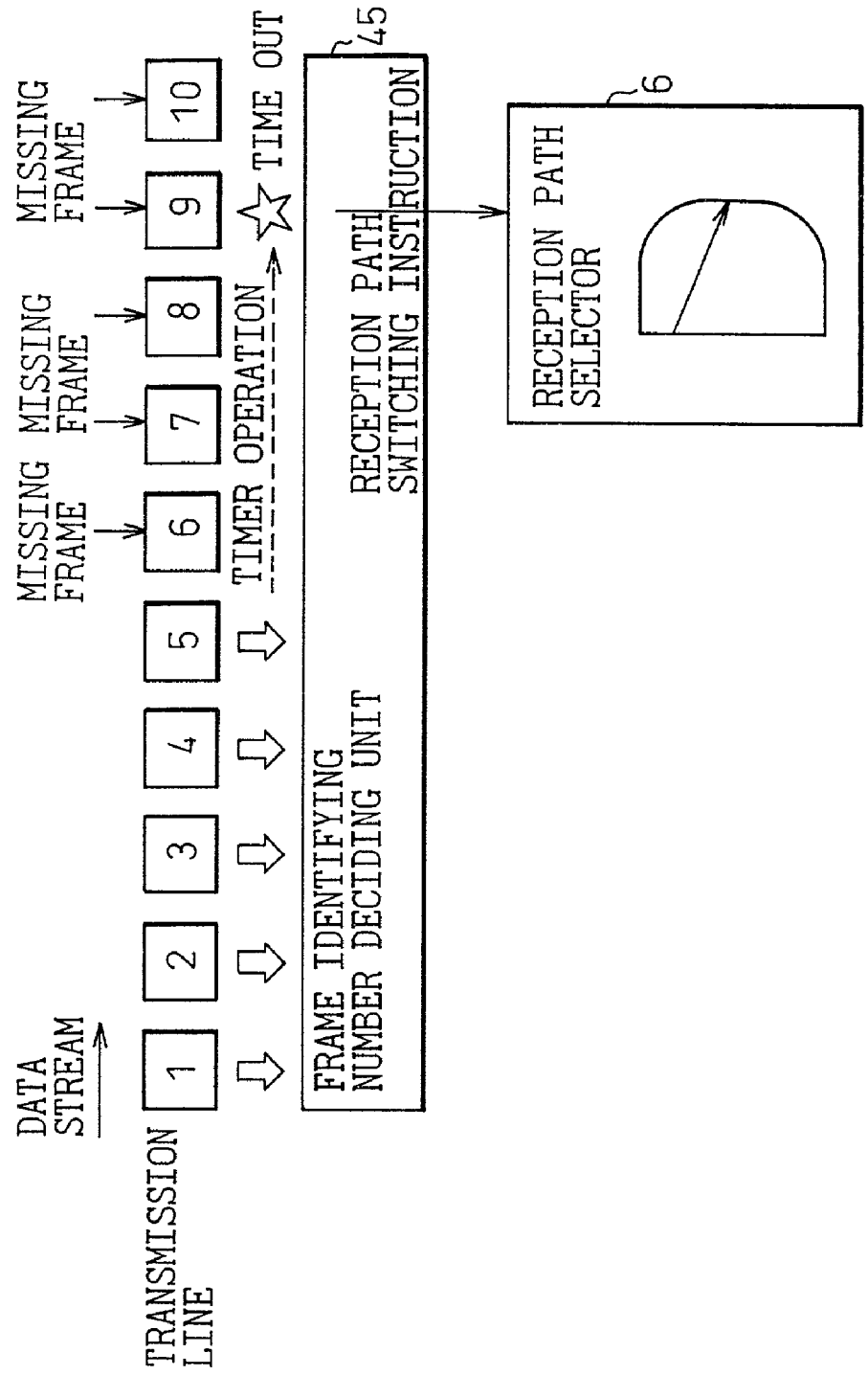

Fig. 26A

TRANSMISSION FRAME IDENTIFYING NUMBER TABLE

| TRANSMISSION APPARATUS 1 TRANSMISSION SEQUENCE NUMBER |
|---|
| TRANSMISSION APPARATUS 2 TRANSMISSION SEQUENCE NUMBER |
| TRANSMISSION APPARATUS 3 TRANSMISSION SEQUENCE NUMBER |
| ⋮ |
| TRANSMISSION APPARATUS n TRANSMISSION SEQUENCE NUMBER |
| BROADCAST TRANSMISSION SEQUENCE NUMBER |

Fig. 26B

RECEPTION FRAME
IDENTIFYING NUMBER TABLE

| TRANSMISSION APPARATUS 1 RECEPTION SEQUENCE NUMBER |
| TRANSMISSION APPARATUS 2 RECEPTION SEQUENCE NUMBER |
| TRANSMISSION APPARATUS 3 RECEPTION SEQUENCE NUMBER |
| ........ |
| TRANSMISSION APPARATUS n RECEPTION SEQUENCE NUMBER |

| ITS OWN PATH 1 RECEPTION SEQUENCE NUMBER |
| ITS OWN PATH 2 RECEPTION SEQUENCE NUMBER |
| ...... |
| ITS OWN PATH n RECEPTION SEQUENCE NUMBER |
| BROADCAST PATH 1 RECEPTION SEQUENCE NUMBER |
| BROADCAST PATH 2 RECEPTION SEQUENCE NUMBER |
| ...... |
| BROADCAST PATH n RECEPTION SEQUENCE NUMBER |

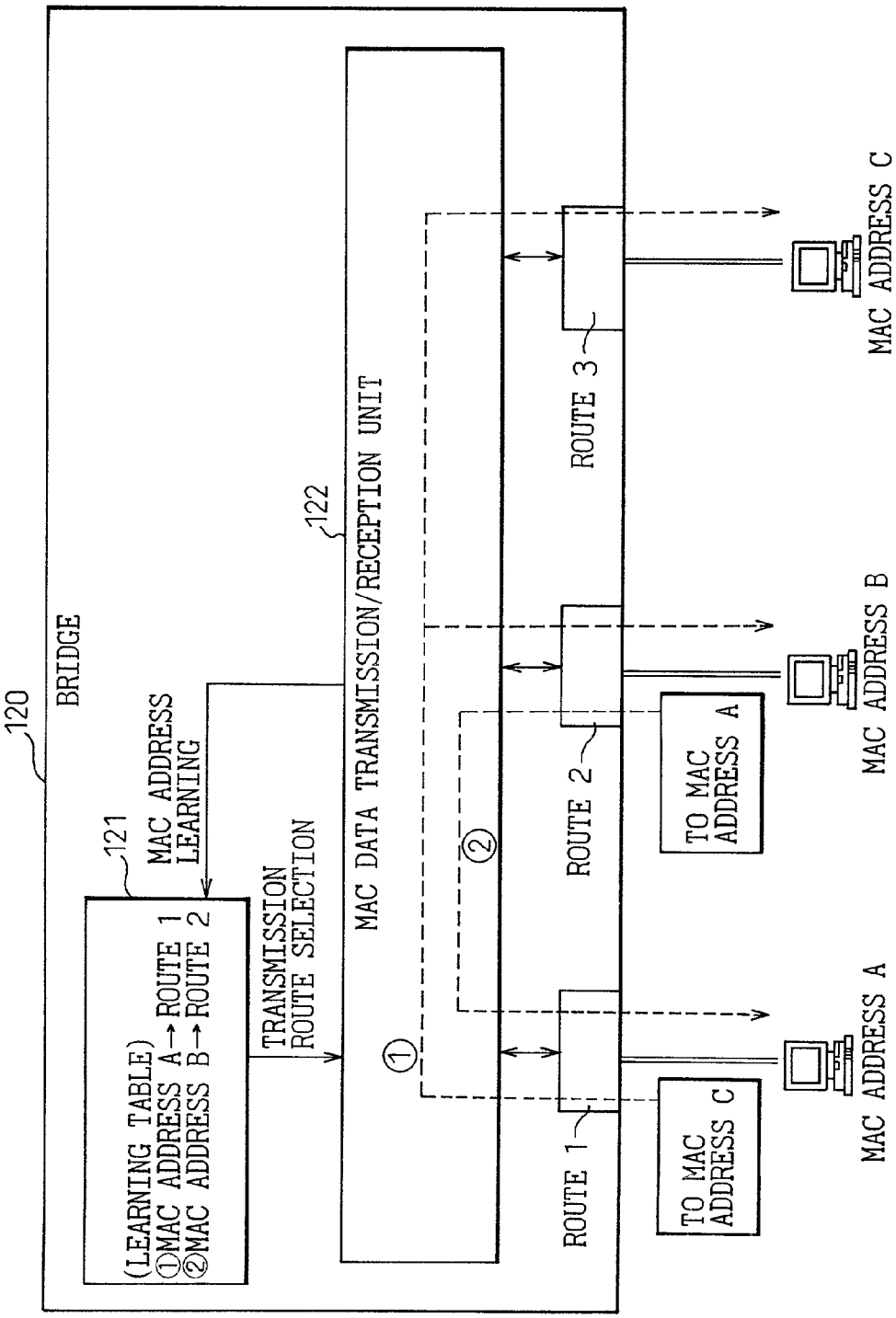

TRANSMISSION APPARATUS AND A METHOD FOR TRANSMITTING DATA IN A DATA TRANSMISSION SYSTEM

BACKGROUND OF THE INVENTION

1. Field of the Invention

The present invention relates to a data transmission system and, in particular, it relates to a transmission apparatus and a method for transmitting data, in a data transmission system. The transmission apparatuses are interconnected for transmitting synchronous data through transmission lines each having a redundant structure. Further, at least one terminal is connected to each transmission apparatus for transmitting or receiving asynchronous data.

2. Description of the Related Art

There is a known data transmission system having the following structure. That is, at least one terminal is connected to a transmission apparatus through an asynchronous network, for example, a local area network (LAN). Further, a plurality of transmission apparatuses are interconnected through transmission lines each formed by a synchronous network. The synchronous network has a redundant structure duplexed by a current line (0-line) and a spare line (1-line). In this case, the data is transmitted or received between the terminal and the transmission apparatus based on the asynchronous data format, and is transmitted or received between transmission apparatuses based on the synchronous data format.

Further, the transmission apparatus at a sending side transmits the same synchronous data on both the current line and spare line. The transmission apparatus at a receiving side receives the synchronous data through the current line. If a failure occurs on the current line, the transmission apparatus at the receiving side switches the transmission line to the spare line in order to receive the synchronous data.

There are, however, some problems in the above-conventional art as explained in detail with reference to the attached drawings. Briefly, as a first problem, a long switching time is needed to switch a line from an abnormal line to a normal line when transmitting the asynchronous data. As a second problem, normal data transmission is interrupted for a long time until another Spanning Tree is re-constructed. As a third problem, the cost of transmission apparatus becomes high because it is necessary to provide a high performance apparatus in order to execute a learning function based on the destination MAC address. Finally, as a fourth problem, safety of data transmission cannot be ensured because a newly learned address is informed from one transmission apparatus to another apparatuses by using broadcast, and there may be some apparatuses which cannot receive the newly learned address.

SUMMARY OF THE INVENTION

The object of the present invention is to provide a transmission apparatus and a method for transmitting data, in a data transmission system, enabling easy confirmation of normality of a transmission line in accordance with periodical transmission or reception of the data, and enabling uniformity of address among all transmission apparatuses in the network.

In accordance with one aspect of the present invention, there is provided a plurality of transmission apparatuses each of which functions as a sending side transmission apparatus and a destination transmission apparatus; each of the plural transmission apparatuses being connected to terminals through an asynchronous network; the plural transmission apparatuses being interconnected through plural transmission lines each formed by a synchronous network; asynchronous data from one of the terminals being transmitted from the sending side transmission apparatus to the plural transmission lines after simultaneous conversion from the asynchronous data to synchronous data; the destination transmission apparatus selecting one of plural reception lines of the synchronous network; and the destination transmission apparatus converting the synchronous data to the asynchronous data and transmitting the asynchronous data to one of terminals through the asynchronous network; each of the transmission apparatuses including: a unit for selecting one of the reception lines each formed by the synchronous network; a unit for transmitting a communication confirming frame to the synchronous network at least at a predetermined period; a communication confirming table for storing each reception time of the communication confirming frame received through the synchronous network, corresponding to each of the reception lines; and a unit for deciding occurrence of failure on the reception line corresponding to the reception time when a difference between a reception time stored in the table and a present time at the predetermined period exceeds a predetermined value, and transmitting instructions of switching the reception line to the reception line selecting unit.

As another aspect of the present invention, each of the transmission apparatuses including: a terminal identifying and learning table for extracting a sending side terminal identifying information of the asynchronous data from the terminal, and for storing the extracted sending side terminal identifying information with the reception time of the extracted sending side terminal identifying information; a unit for transmitting contents of the terminal identifying and learning table to all transmission apparatuses connected to the synchronous network using the terminal identifying and informing frame; and a transmission apparatus identifying and learning table for storing the terminal identifying information of the contents of the terminal identifying and informing frame received from the synchronous network, corresponding to the sending side transmission apparatus of the terminal identifying and informing frame, and for learning terminal identifying information connected to each transmission apparatus.

As still another aspect of the present invention, a method for transmitting data in a data transmission system which is structured by a plurality of transmission apparatuses each of which functions as a sending side transmission apparatus and a destination transmission apparatus; the method including steps of: transmitting a communication confirming frame from one of the transmission apparatus to the synchronous network at least at a predetermined period; storing the reception time of the communication confirming frame corresponding to the reception line in the transmission apparatus which received the communication confirming frame; comparing a reception time of the communication confirming frame stored in the table at a predetermined period and corresponding to the reception line, with a present time; and deciding occurrence of failure on the reception line corresponding to the reception time when a difference between the reception time and the present time exceeds a predetermined value, and controlling a reception line selecting unit so as to select a normal reception line.

As still another aspect of the present invention, the method including the steps of: extracting sending side terminal identifying information of the asynchronous data from one of the terminal, and storing the extracted information in a terminal identifying and learning table; transmitting contents of the terminal identifying and learning table to all transmission apparatuses connected to the synchronous network using a terminal identifying and informing frame; storing the terminal identifying information of the contents of the terminal identifying and informing frame received through the synchronous network in a transmission apparatus identifying and learning table, corresponding to the sending side transmission apparatus of said terminal identifying and informing frame; and adding a destination apparatus identifying information based on the identifying information of the terminal referring to said learning table, to said asynchronous data from the terminal through the asynchronous network, and transmitting the destination apparatus identifying information to the synchronous network.

BRIEF DESCRIPTION OF THE DRAWINGS

FIG. 1 is a view for explaining a basic structure according to a first embodiment of the present invention.

FIG. 2 is a view for explaining transmission format.

FIG. 3 is a view for explaining an essential portion of an IT frame layer.

FIG. 4 is a view for explaining a communication confirming table which is one example of a communication confirming table in FIG. 8.

FIGS. 6A and 6B are process flowcharts for explaining the operation of the reception line deciding unit 7 in FIG. 1.

FIG. 21A is a view for explaining a transmission frame identifying number table.

FIG. 21B is a view for explaining a reception frame identifying number table.

FIGS. 23A and 23B are views for explaining switching of the reception line.

FIG. 26A is a view for explaining the transmission frame identifying number table, FIG. 26B is a view for explaining the reception frame identifying number table.

FIG. 34 is a view for explaining a learning function in above structures.

DESCRIPTION OF THE PREFERRED EMBODIMENTS

Before describing preferred embodiments, a basic structure and its problem will be explained in detail with reference to the attached drawings.

Figure 28:
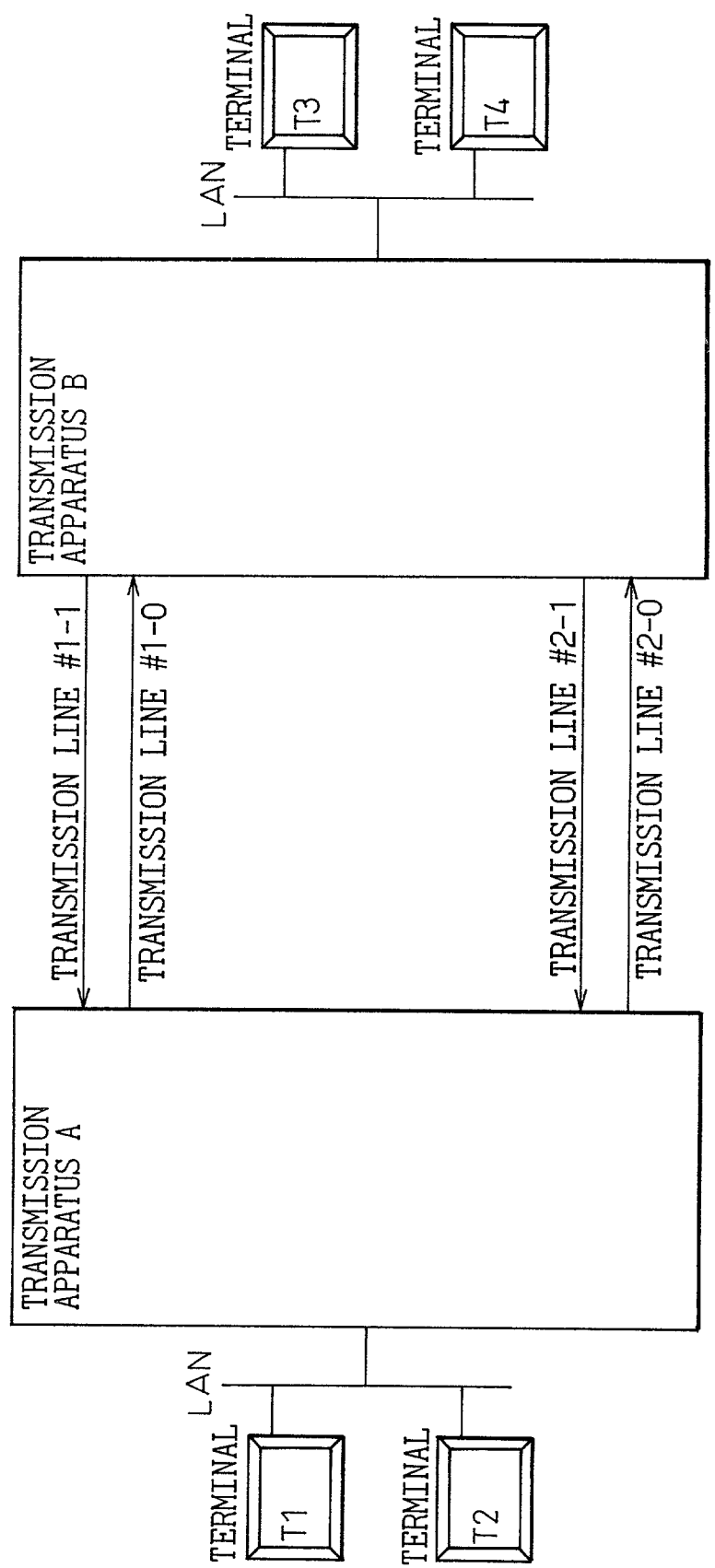
FIG. 28 is a view for explaining a basic network structure.

FIG. 28 is a view for explaining a basic network structure. As shown in the drawing, a transmission apparatus A and a transmission apparatus B are interconnected through transmission lines duplexed by #1-0, #2-0 and #1-1, #2-1, each formed by the synchronous network in order to transmit synchronous data having, for example, a synchronous digital hierarchy (SDH) frame. Further, a plurality of terminals T1 to T4 are connected to the transmission apparatuses A and B through the LAN in order to transmit the asynchronous data having, for example, a media access control (MAC) frame.

Figure 29:
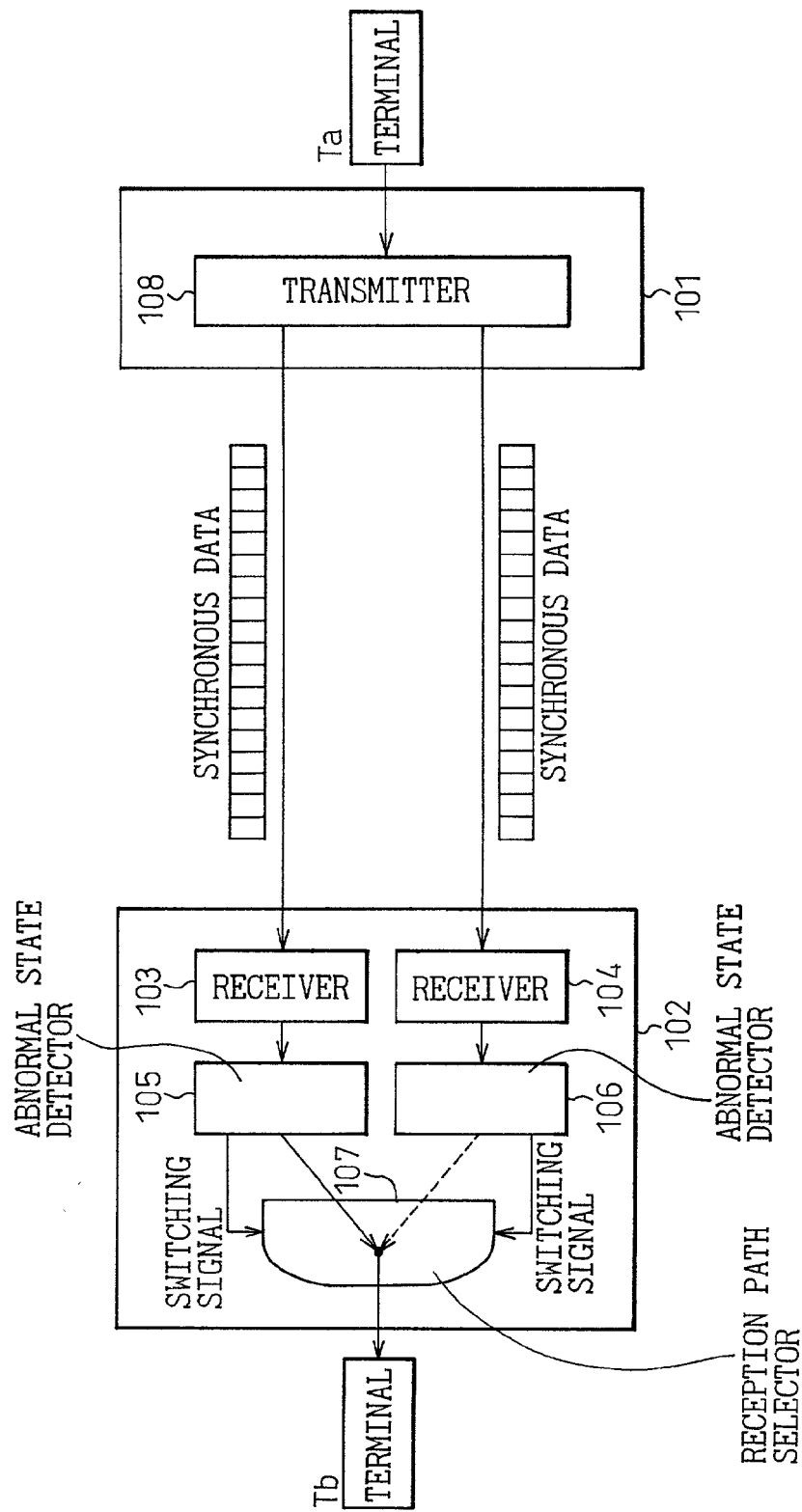
FIG. 29 is a view for explaining a path selecting function of the transmission apparatus shown in FIG. 28.

FIG. 29 is a view for explaining a path selecting function of the transmission apparatus shown in FIG. 28. In the drawing, Ta and Tb are terminals; 101 and 102 are transmission apparatus corresponding to the transmission apparatuses A and B in FIG. 28; 103 and 104 are receiving units; 105 and 106 are abnormal state detectors; 107 is a reception path selector; and 108 is a transmission unit. When the transmission apparatus 101 receives the asynchronous data from the terminal Ta, the transmission unit 108 converts the asynchronous data to the synchronous data and transmits the synchronous data to the duplexed transmission lines.

The reception units 103 and 104 in the transmission apparatus 102 receive the same synchronous data. The abnormal state detectors 105 and 106 detect a received interruption, an alarm display signal (AIS), and a switching instruction due to K1 and K2 bytes of section overhead of the SDH frame. Further, each of the abnormal state detectors 105 and 106 adds a switching signal on the synchronous data, and transmits the switching signal to the reception path selector 107 with the synchronous data. An output of the reception path selector 107 is converted to the asynchronous data by using a converter (not shown) and transmitted to the terminal Tb. For example, when the reception path selector 107 selects the path shown by the solid line, and when the abnormal state detector 105 detects abnormal state, the abnormal state detector 105 provides the switching signal to the reception path selector 107, and switches the path to the abnormal state detector 106 as shown by the dotted line. Accordingly, the synchronous data received by the reception unit 103 is switched to the synchronous data to be processed by the reception unit 104, and transmitted to the terminal Tb. As a result, even if a failure occurs in the transmission line of the reception unit 103, it is possible to receive and process the synchronous data in the reception unit 104.

Figure 30:
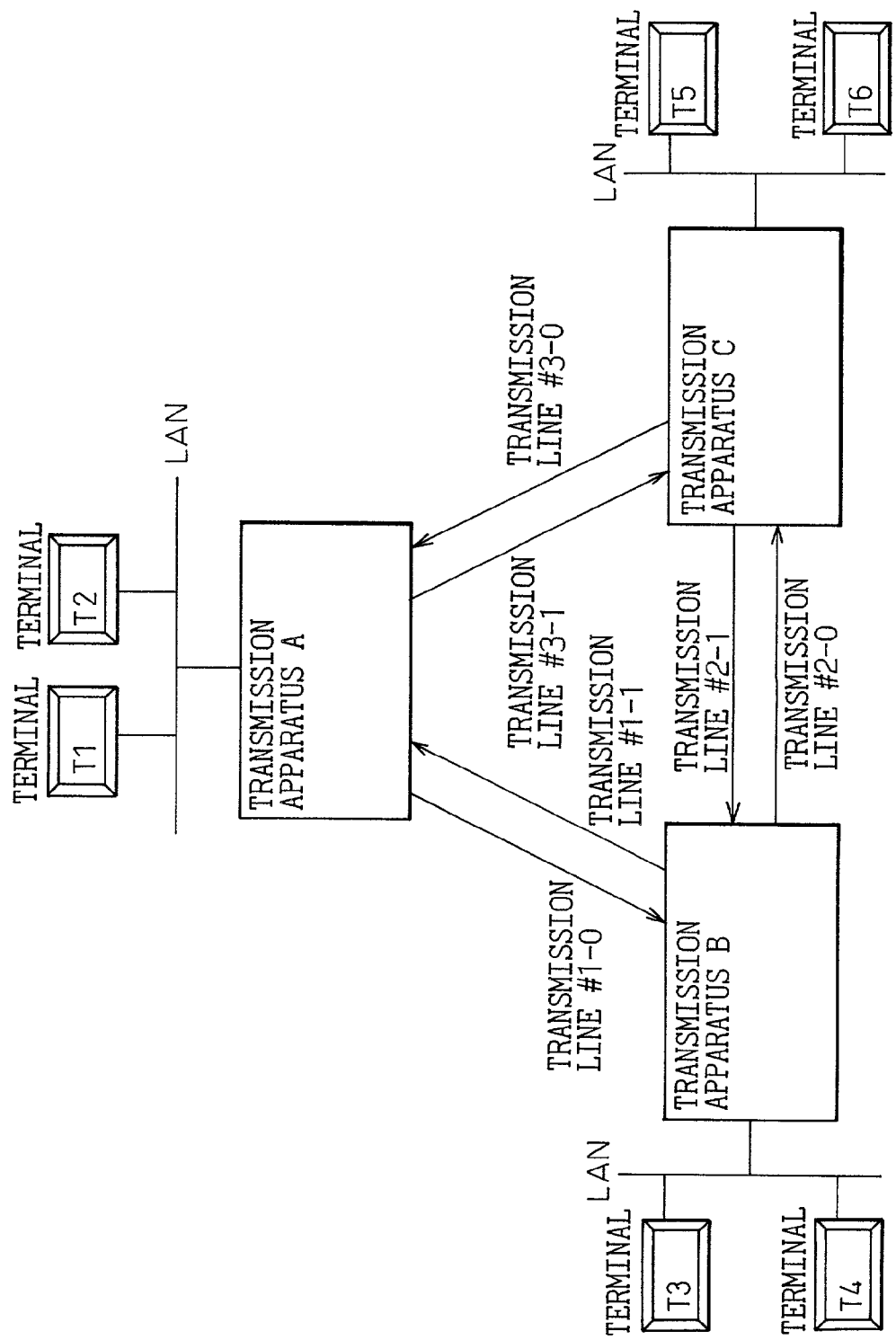
FIG. 30 is a view for explaining another basic network structure.

FIG. 30 is a view for explaining another basic network structure. This structure shows a known ring-like network in which the transmission apparatuses A to C are interconnected through ring-like transmission lines as a synchronous network. Further, terminals T1 and T2 are connected to the transmission apparatus A through the LAN as asynchronous network. Similarly, terminals T3 and T4 are connected to the transmission apparatus B through the LAN, and terminals T5 and T6 are connected to the transmission apparatus C through the LAN. The duplexed lines are used among the transmission apparatuses A to C.

Figure 31:
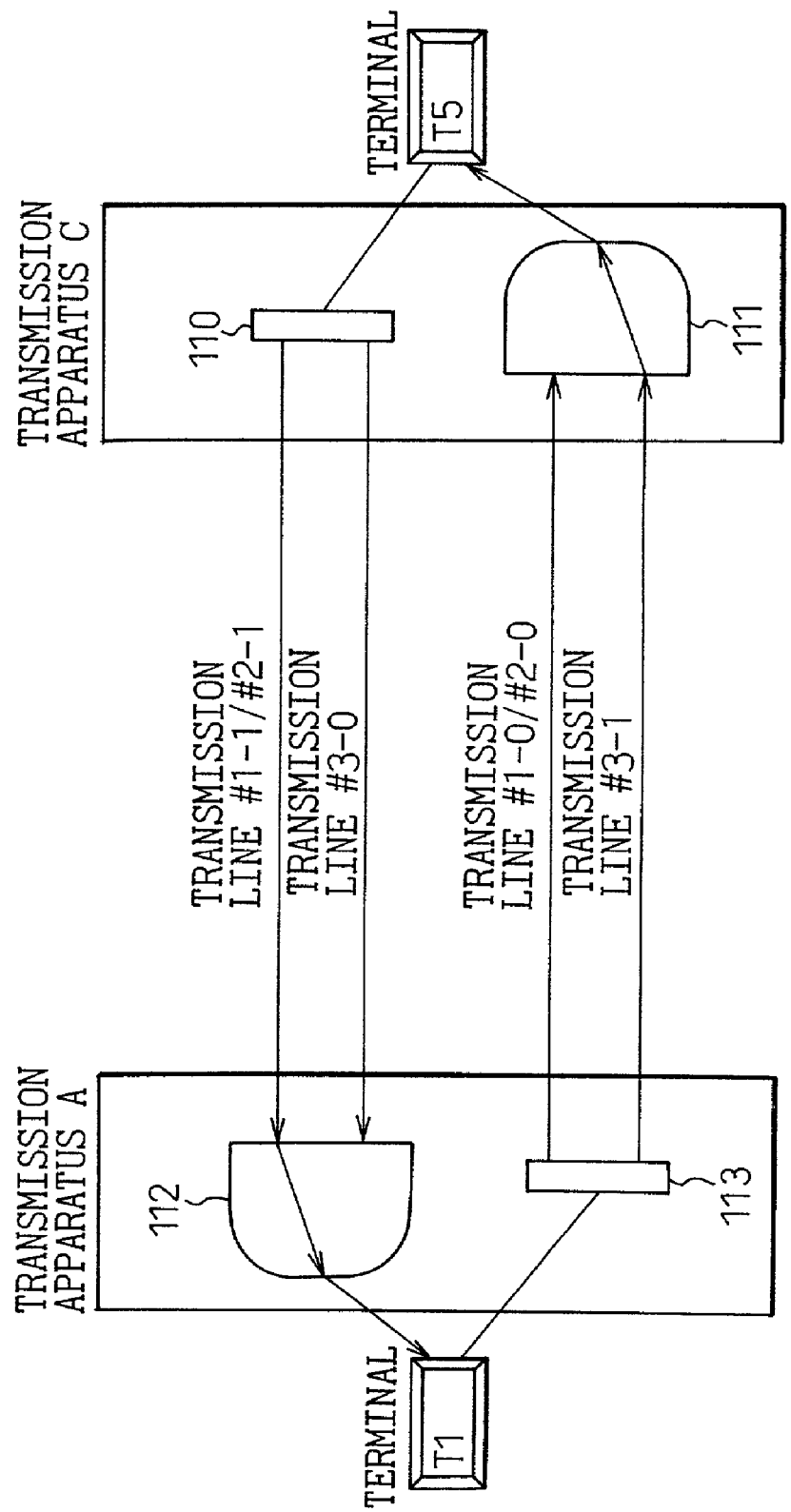
FIG. 31 is a view for explaining one example of a reception path selecting function.

FIG. 31 is a view for explaining one example of a reception path selecting function. 110 and 113 are transmitters, and 111 and 112 are reception path selectors. As shown in the drawing, there are two paths between the terminal T1 and terminal T5. That is, one path is transmission lines #3-0 and #3-1 between the transmission apparatuses A and C, and the other path is transmission lines #1-0 and #1-1 between the transmission apparatuses A and B plus transmission lines #2-0 and #2-1 between the transmission apparatuses B and C. The asynchronous data from the terminal T5 is converted to the synchronous data in the transmitter 110, and transmitted to the transmission lines #3-0 and #2-1. In this case, the reception path selector 112 selects the transmission line #1-1 passing through the transmission apparatus B, converts the synchronous data to the asynchronous data, and transmits the asynchronous data to the terminal T1.

Further, the transmitter 113 converts the asynchronous data from the terminal T1 to the synchronous data, and transmits the synchronous data to the transmission lines #3-1 and #1-0. The reception path selector 111 selects the path of the transmission line #3-1 as shown by the solid line, converts the synchronous data to the asynchronous data, and transmits the asynchronous data to the terminal T5.

Figure 32:
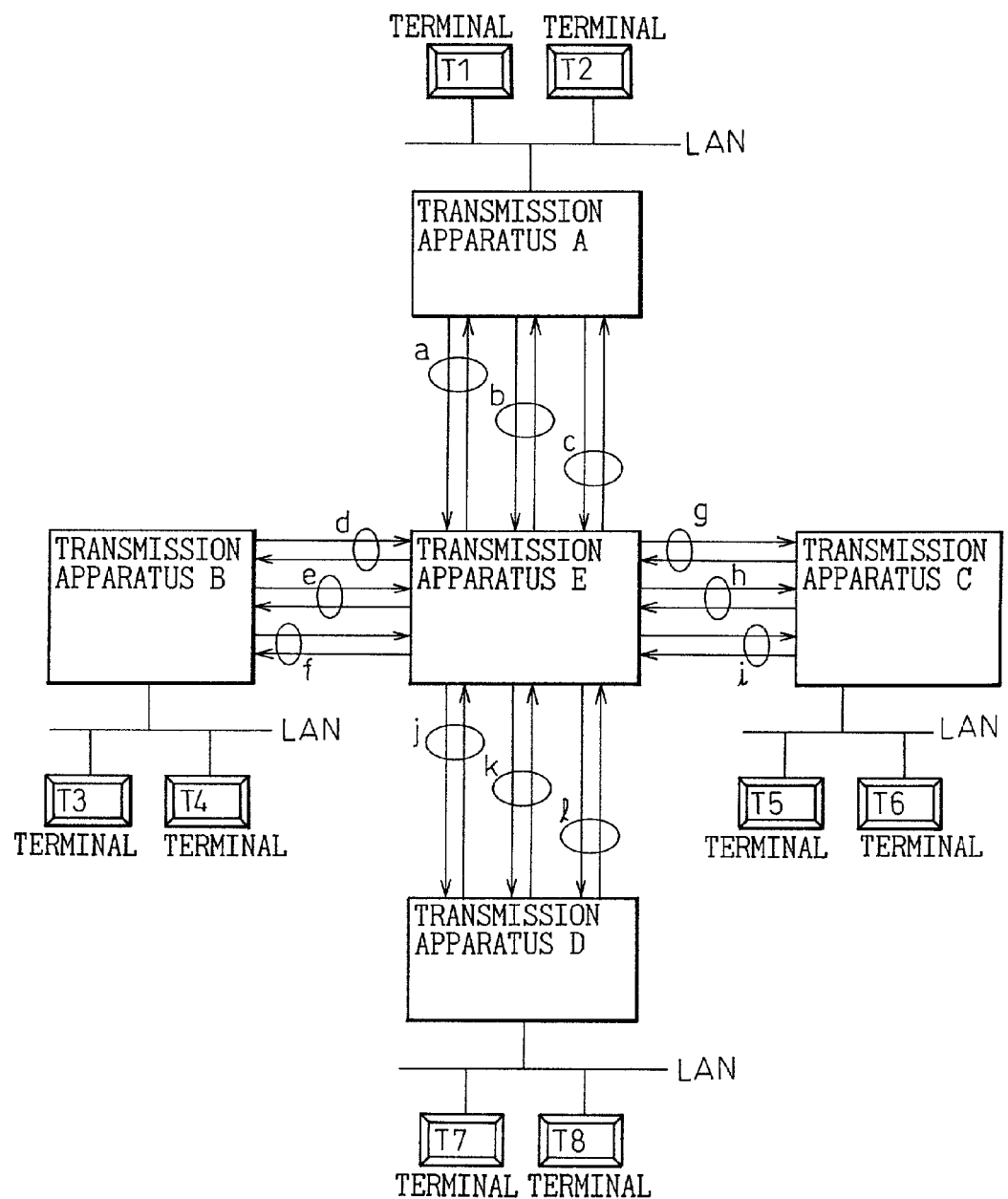
FIG. 32 is a view for explaining still another basic network structure.
Figure 33:
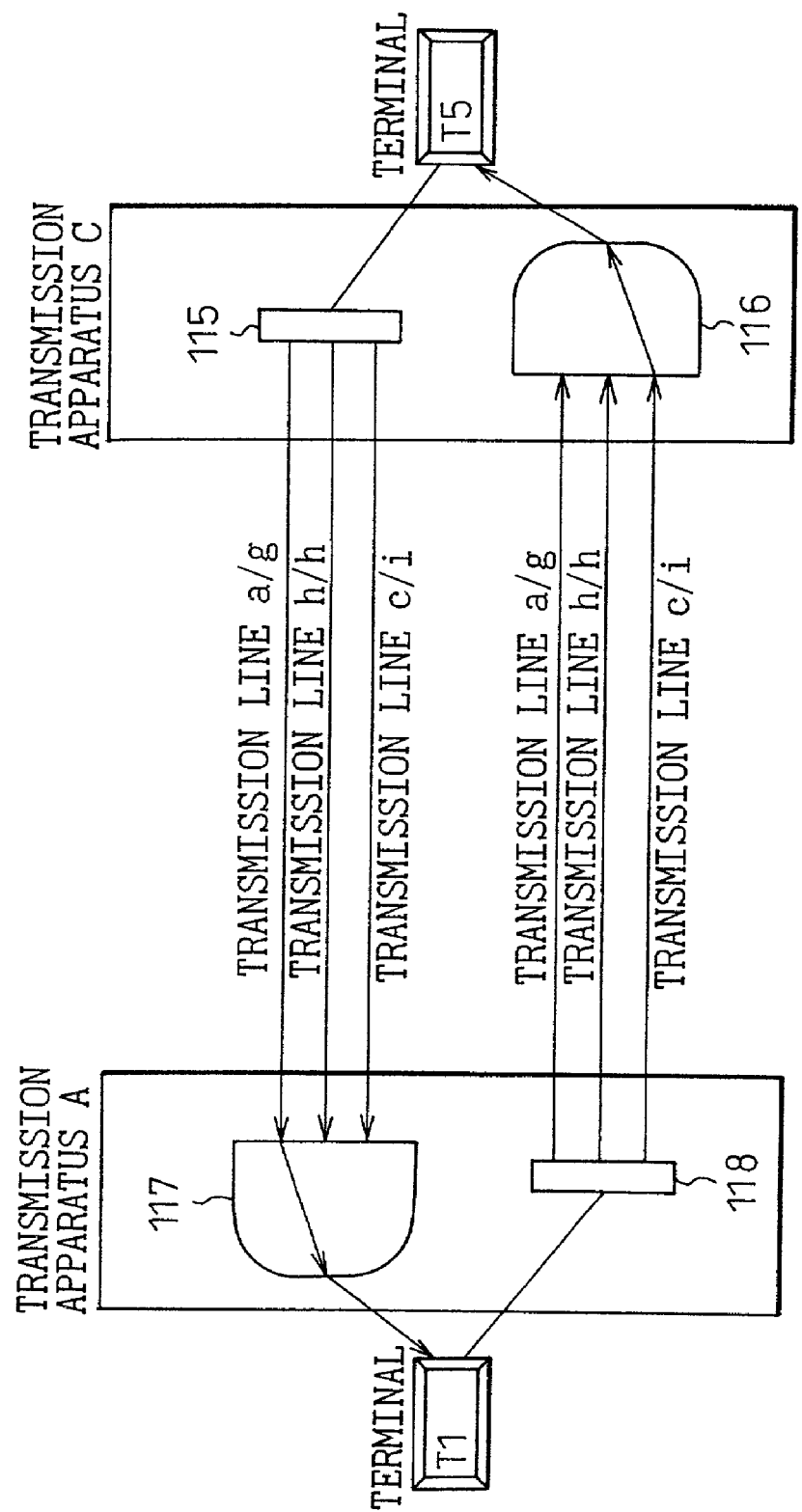
FIG. 33 is a view for explaining another example of the reception path selectors.

FIG. 32 is a view for explaining still another basic network structure. Each of transmission apparatuses A to D is connected to the corresponding terminals T1 to T8 through the asynchronous network such as LAN. Further, each of transmission apparatuses A to D is interconnected through the transmission apparatus E and transmission lines "a" to "l" so as to form a mesh-like network. The path between the terminal T1 and T5 is briefly shown in FIG. 33. In FIG. 33, 115 and 118 are transmitters, and 116 and 117 are reception path selectors.

FIG. 33 is a view for explaining another example of the reception path selectors. The asynchronous data from the terminal T5 is converted to the synchronous data in the transmitter 115, and transmitted to the transmission apparatus A through the transmission lines "g", "h" and "i" the transmission apparatus E, and transmission lines "a", "b" and "c". Accordingly, the reception path selector 117 in the transmission apparatus A selects any one of the transmission lines "a", "b" and "c", and converts the synchronous data to the asynchronous data in order to transmit the same to the terminal T1. Similarly, the asynchronous data from the terminal T1 is converted to the synchronous data in the transmitter 118, and the synchronous data is transmitted to the transmission lines "a", "b" and "c". The reception path selector 116 in the transmission apparatus C selects any one of the transmission lines transmission lines "g", "h", and "i", and converts the synchronous data to the asynchronous data. The asynchronous data is transmitted to the terminal T5.

The transmission apparatus is managed by, for example, a MAC (Media Access Control) address of the terminal. The MAC address is transmitted to the route corresponding to the destination MAC address. Further, when the destination MAC address added to the reception data is shown by the MAC address of the terminal connected to its own transmission apparatus, there is means for transmitting the reception data to the terminal. In this case, there is a known means for learning the relationship between the MAC address and the terminal or the route and storing the relationship in a table.

FIG. 34 is a view for explaining a learning function in above structures. As shown in the drawing, a bridge 120 includes a learning table 121 and a MAC data transmission/reception unit 122. The relationship between the MAC address and the route is sequentially learned and stored in the learning table 121. For example, when the MAC data transmission/reception unit 122 receives a MAC frame including the sending side MAC address A and the destination MAC address C through the route 1, it is possible to recognize a terminal of the sending side MAC address A being connected to the route 1. Accordingly, the MAC data transmission/reception unit 122 instructs "learning of MAC address" to the learning table 121 so as to indicate "MAC address A→route 1".

Further, when the MAC data transmission/reception unit 122 receives the MAC frame including the sending side MAC address B and the destination MAC address A through the route 2, the MAC data transmission/reception unit 122 instructs "learning of MAC address" to the learning table 121 so as to indicate "MAC address B→route 2" so that it is possible to recognize the MAC address B being connected to the route 2. Accordingly, for example, when the MAC data transmission/reception unit 122 receives the MAC frame including the receiving side MAC address A from another route, the unit 122 refers to the learning table 121, and the unit 122 transmits the MAC frame to the route 1 since the unit 122 can recognize that the terminal of the MAC address A is connected to the route 1. Similarly, the MAC frame including the receiving side MAC address B can be transmitted to the route 2.

Further, when there is a newly learned address, the newly learned address is broadcasted to all transmission apparatuses in the network by using the same frame including a newest identifier. Each transmission apparatus executes the update process of an address table. When the new address occurs due to increase of terminal, the new address is informed to the transmission apparatus provided in the network. The above structure has been disclosed in, for example, Japanese Unexamined Patent Publication No. 9-107371.

However, the above-explained structures have the following problems.

a) As the first problem, a long switching time is needed to switch a transmission line from an abnormal line to a normal line when transmitting the asynchronous data. This is because, in general, as the reception interval of the asynchronous is not constant, if the asynchronous data is not received for a long time, it is very difficult to determine whether the transmission line is normal or abnormal.

b) As the second problem, normal data transmission is interrupted for a long time until another Spanning Tree is re-constructed because, when a failure path such as an "endless loop" occurs in a network formed by physical loops which is confirmed by using a Spanning Tree Protocol, another Spanning Tree is constructed.

c) As the third problem, a cost of transmission apparatus becomes high because it is necessary to provide a high performance apparatus in order to execute a learning function based on the destination MAC address. This is because it is necessary to set a holding time (i.e. a value of an aging timer) for learning an address in each MAC address transmitted from the sending side terminal.

d) As the fourth problem, the safety of data transmission cannot be ensured because a newly learned address is informed from one transmission apparatus to another apparatuses by using broadcast, and there may be some apparatuses which cannot receive the newly learned address.

The preferred embodiments of the present inventions will be explained in detail with reference to the attached drawings.

FIG. 1 is a view for explaining a basic structure according to a first embodiment of the present invention. Number 1 is a transmission apparatus; number 2 is a transmission line data transmitter; number 3 is a transmission line data receiver; number 4 is a terminal data receiver; number 5 is a terminal data transmitter; number 6 reception line selector; number 7 is a reception line deciding unit; number 8 is a communication confirming table; number 9 is an identifier attaching unit; and number 10 is a communication confirming frame informing unit.

Each of the line data transmitter 2 and line data receiver 3 is connected to N transmission lines XN formed by synchronous network (Three transmission lines are shown in FIG. 1). The terminal data receiver 4 and the terminal data transmitter 5 are connected to the asynchronous network.

The terminal data receiver 4 receives data frame from the terminal through the asynchronous network. The identifier attaching unit 9 attaches the identifier (i.e., an IT cell header explained below) to the data frame, and sets information for identifying its own apparatus into the identifier. Further, communication confirming frame informing unit 10 generates a communication confirming frame which sets a frame identifying information indicating the communication confirming frame and an identifying information of its own apparatus indicating the sending side to the identifier, and transmits the communication confirming frame to the transmission line data transmitter 2. The line data transmitter 2 converts asynchronous data such as a MAC frame to synchronous data such as an SDH frame, and transmits the communication confirming frame or the data frame to all transmission lines. Further, communication confirming frame informing unit 10 controls transmission of the communication confirming frame at a predetermined period.

The line data receiver 3 converts synchronous data to asynchronous data, and extracts the data frame from the transmission line of the synchronous network. Further, the line data receiver 3 identifies whether it is the communication confirming frame or the data frame transmitted to the asynchronous network. The communication confirming frame is transferred to the transmission line deciding unit 7. The data frame is transferred to the terminal data transmitter 5 through the reception line sector 6 after eliminating the identifier (i.e., IT cell header).

The reception line deciding unit 7 stores time information indicating reception of the communication confirming frame into the communication confirming table 8, corresponding to each transmission apparatus and reception line. Further, the reception line deciding unit 7 compares reception time of the communication confirming frame, which is transmitted from each apparatus and reception line in the communication confirming table 8, with the present time, and determines the reception line exceeding a predetermined time as being faulty. Further, the deciding unit 7 adds a switching instruction of the reception line. The reception line selector 6 switches the transmission line through the line data receiver 3 in accordance with the instruction from the reception line deciding unit 7, and transmits the data frame through the asynchronous network from the terminal data transmitter 5.

Accordingly, the reception line deciding unit 7 can confirm normality of the reception line every period of transmission of the communication confirming frame, and can switch the faulty line to the normal line when the failure occurs. That is, this corresponds to supervision of the reception line by providing a confirming timer in each reception line so that it is possible to quickly detect the failure and to switch the reception line without overlap of data from reception lines.

FIG. 2 is a view for explaining transmission format. A layer structure is formed by a data link layer, an IT frame layer, an IT cell layer, and a SDH layer. In the data link layer, PA denotes a preamble, and SFD denotes a start frame delimiter. DA denotes a destination MAC address and, for example, DA becomes a broadcast address when all are $F_{16}$. SA denotes a sending side MAC address, VLAN-TAG denotes a virtual LAN tag, LENGTH/TYPE denotes either the number of the octet of data stored in the data filed or a field for adding a type indicating a protocol of the upper layer. DATA/PAD denotes a field of data for adding insufficient bytes necessary for obtaining minimum 64 bytes as a pad section. FCS denotes a frame check sequence in which the upper of each filed denotes the number of byte. The MAC frame is formed of 64 to 1522 bytes.

The IT frame layer has a frame data FDATA formed by eliminating the frame check sequence FCS from the MAC frame, the frame check sequence FCS and an entire length L. The IT cell layer has a cell data. CDATA formed by dividing the IT frame into every 73 bytes and the IT cell header having five bytes. The IT cell header corresponds to the identifier attached by the identifier attaching unit 9 in FIG. 1.

In the IT cell header, CNT denotes a control filed. DA denotes a destination apparatus address, for example, 0 being invalid, 255 being broadcast. Further, SA denotes a sending side apparatus address, for example, 0 and 255 being invalid. LIFE is used for relaying the IT cell, and the IT cell is decremented by −1 when it is relayed. When the IT cell having a value "0" is received, that IT cell is cancelled. Further, HEC denotes a header error control. Still further, in the CNT of the IT cell header, USD denotes a valid/invalid bit of the IT cell, DL (1-0) denotes a cell dividing delimiter for indicating a position where the frame data FDATA is divided. For example, "00", is a first cell, "01" is a intermediate cell, "10" is a final cell, and "11" is a single cell. Further, FT denotes a frame type bit, RAV denotes a relay available bit, GP is a group address when it is "1", and is a normal address when it is "0". Rsv denotes a reserve bit.

In the SDH layer, one are move IT cells are inserted to a payload DATA-TS in the SDH. For example, the transmission rate is set to 1.5 Mbps to 102.016 Mbps. Further, the IT cell is transmitted to the transmission line connected between apparatuses, as the synchronous data of the SDH format. Further, the IT cell is extracted from the payload of the synchronous data received through the transmission line, and it is determined whether the extracted IT cell indicates its own apparatus or not in accordance with the destination apparatus address of the header of the IT cell. When it indicates either its own apparatus or broadcast, the IT frame is assembled by eliminating the header portion. The frame data FDATA is assembled as a main portion of the MAC frame, and transmitted to the terminal as the asynchronous data.

FIG. 3 is a view for explaining an essential portion of the IT frame layer. Number 11 is an IT frame layer; number 12 is an interface of the IT cell; number 13 is an interface of the MAC frame; number 14 is an assembly/disassembly unit of the IT frame; number 15 is a frame type identifying unit; number 16 is a multi-transmission processor; number 17 is route selector; number 18 is a reception buffer; number 19 is a selector; and number 20 is a transmission buffer.

As explained above, the IT frame is formed by the entire length L, the frame data FDATA and the frame check sequence FCS, and by eliminating the preamble PA and the frame start delimiter SFD from the MAC frame. The IT frame is transmitted and received between terminals connected to the LAN through the interface 13, and the IT cell is transmitted and received between IT cells through the interface 12. Further, the assembly/disassembly unit 14 converts the IT cell to the IT frame, and converts the IT frame to the IT cell.

The frame type identifying unit 15 identifies whether it is the control frame of the communication confirming frame or the data frame, based on the frame type bit FT of the header of the IT cell. The control frame is temporally stored in the reception buffer 18 and transferred to a processor (not shown). Further, the route selector 17 selects either 0-route or 1-route, and the data frame is transferred from the selected route to the terminal through the interface 13.

The transmission buffer 20 temporally stores the control frame of the communication confirming frame transmitted from the processor. The selector 19 selects the data frame from the terminal through the interface 13 and the control frame from the transmission buffer 20, and transmits selected frame to the 0-route and 1-route from the multi-transmission processor 16. The assembly/disassembly unit 14 disassembles the selected frame to the IT cell, and transmits the IT cell to the IT cell unit through the interface 12. The IT cell (not shown) inserts the IT cell to the payload of the SDH frame, and transmits the IT cell to the 0-route and 1-route. Further, the IT cell is separated from the payload of the SDH frame received through the transmission lines of the 0-router and the 1-route.

Figure 8:
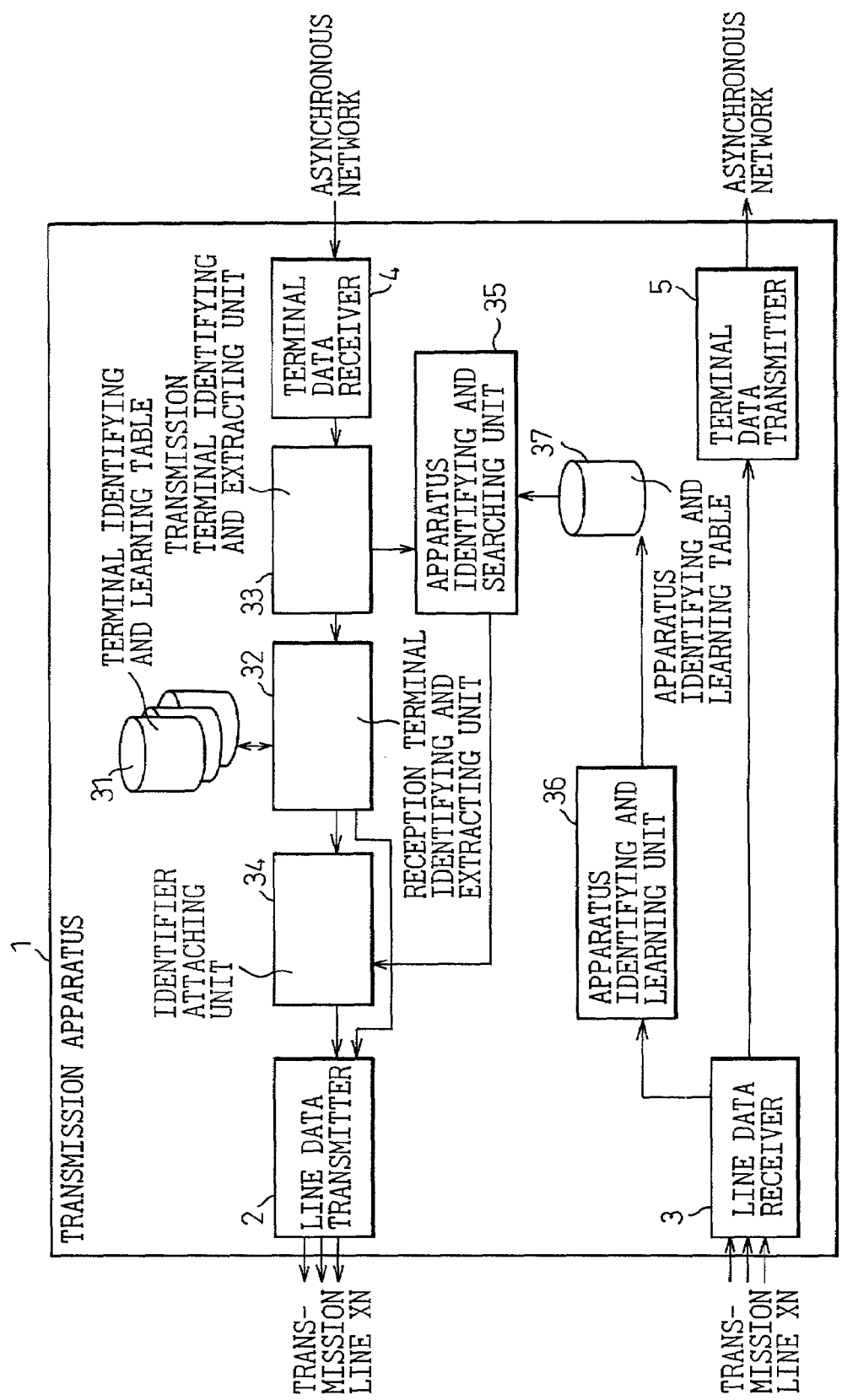
FIG. 8 is a view for explaining a basic structure according to a second embodiment of the present invention.

FIG. 4 is a view for explaining a communication confirming table which is one example of the communication confirming table 8 in FIG. 8. The communication confirming table includes communication managing information corresponding to each of transmission apparatuses 1 to n. Further, each communication managing table stores an identifying number and reception time of communication confirming frame corresponding to each of transmission apparatuses 1 to n.

Figure 5:
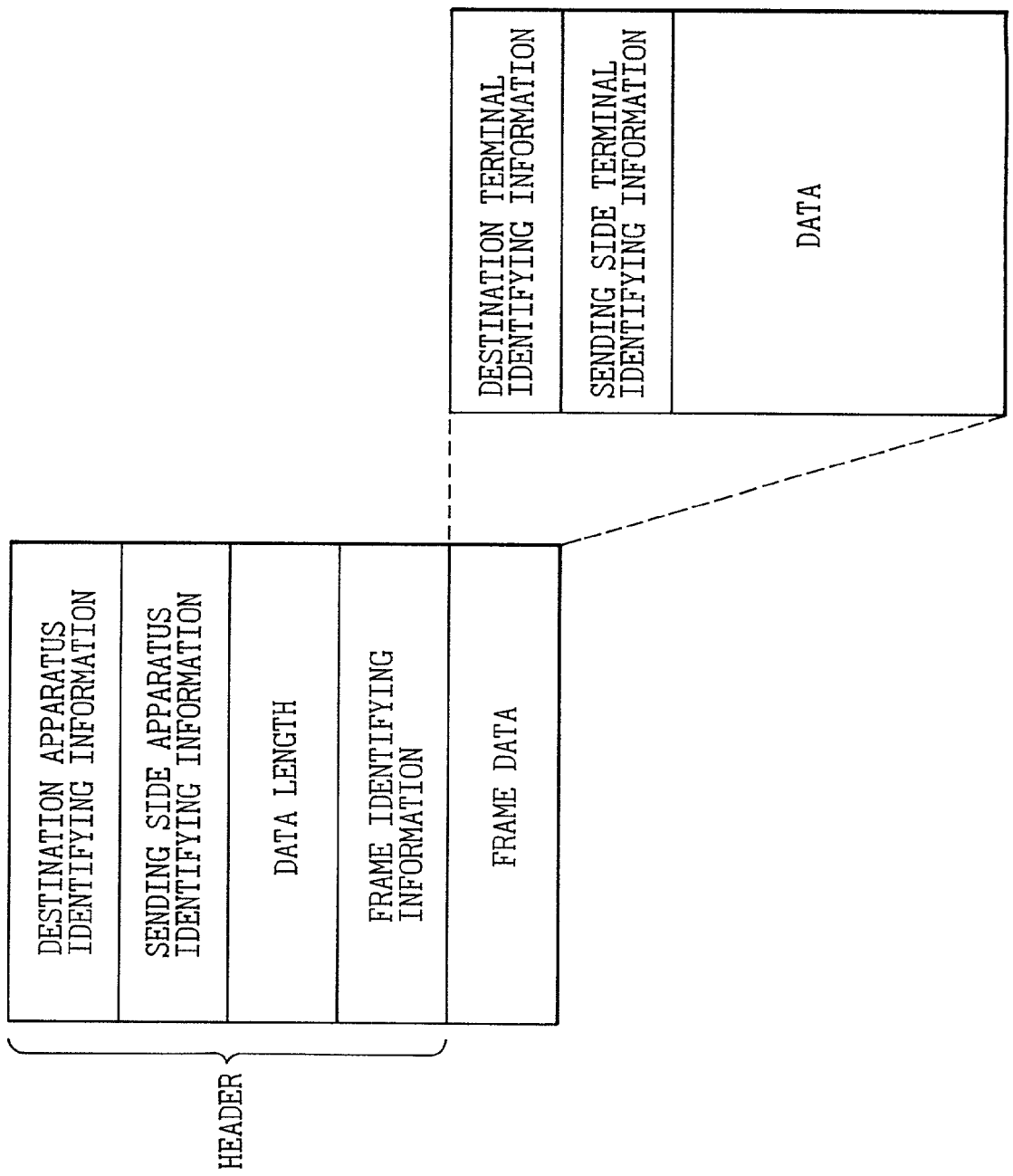
FIG. 5 is a view for explaining frame structure.

FIG. 5 is a view for explaining frame structure. In the identifier attaching unit 9, the header is attached to the frame data as the identifier. The header corresponds to the header of the IT cell layer in FIG. 2, and formed by a destination apparatus identifying information, a sending side apparatus identifying information, a data length, and a frame identifying information. In this case, since the communication confirming frame is broadcast, the destination apparatus identifying information can be omitted and the filed of the sequence number can be provided. The communication confirming frame is informed to the line data transmitter 2 every predetermined period based on the function of the communication confirming frame informing unit 10. The synchronous data indicating the communication confirming frame based on the frame identifying information is broadcasted to all transmission apparatuses connected to the synchronous network.

The line data receiver 3 identifies whether it is the data frame or the communication confirming frame, based on the frame identifying information. The communication confirming frame is transferred to the reception line deciding unit 7, and the data frame is transferred to the reception selector 6. The reception line deciding unit 7 stores the reception time for each reception line in the area corresponding to the identifying information of each sending side apparatus in the communication table 8, as shown in FIG. 4. Further, the reception line deciding unit 7 confirms the normality of the reception line based on the reception time.

Figure 6A:
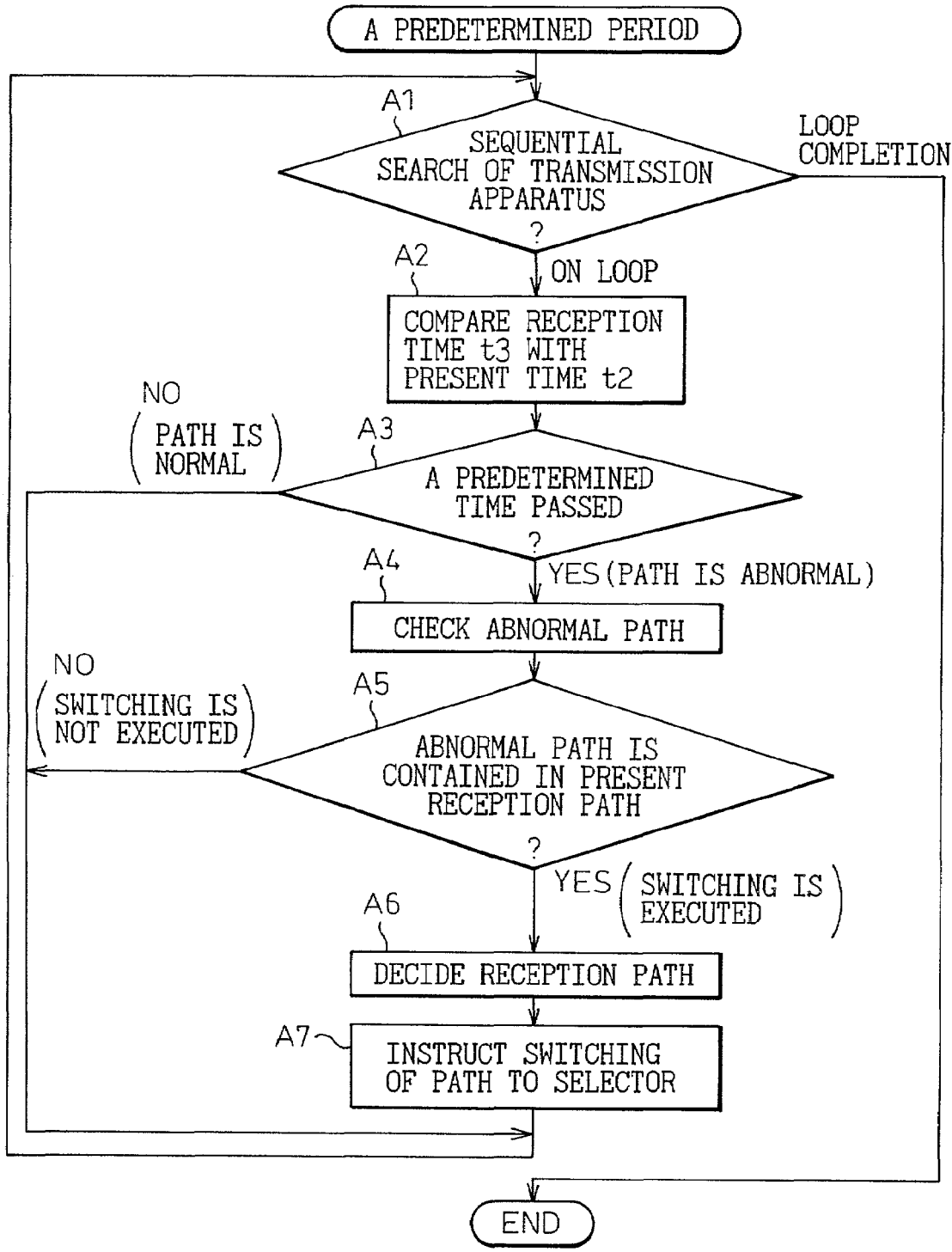

FIGS. 6A and 6B are process flowcharts for explaining the operation of the reception line deciding unit 7 in FIG. 1. The flowchart A shows determining processes of the reception line, and the flowchart B shows reception processes of the communication confirming frame. In the reception processes, the line data receiver 3 in FIG. 1 receives the communication confirming frame (B1). When the communication confirming frame is transferred to the reception line deciding unit 7, the reception line deciding unit 7 extracts the sending side apparatus identifying information (B2). Further, as shown in FIG. 4, the sending side apparatus identifying information and the reception time of the communication confirming frame corresponding to each reception line are set to the communication confirming table 8 (B3).

In the determining processes of the reception line deciding unit 7, the transmission apparatus to be managed in the communication confirming table 8 is sequentially searched (A1). The deciding unit 7 compares the reception time t3 corresponding to sending side apparatus identifying information of the table 8 with the present time t2 at a predetermined period (A2). Further, the deciding unit 7 determines whether (t2−t3)>=t5, i.e., whether the difference (t2−t3) exceeds a predetermined time t5 (A3). When the difference time does not exceed the time t5, the deciding unit 7 determines as the reception line corresponding to the sending side apparatus being normal, and process moves to step A1. On the other hand, when the difference exceeds the time t5, the deciding unit 7 determines as the reception line being abnormal, and the deciding unit 7 checks the abnormal reception line whether it is the present reception line (A4).

Further, the deciding unit 7 determines whether the abnormal line is the present line (A5). When the abnormal line is not the present line, the switching of the reception line is not executed (NO in step A5) and the process is moved to step A1. On the other hand, when the abnormal line is the present line, the switching of the reception line is executed (YES) in step (A5). Further, the deciding unit 7 determines usable reception lines from a plurality of reception lines (A6). The deciding unit 7 generates switching instruction to the reception line selector 6 so as to switch the line to the usable reception line (A7), and the process moves to step A1. Further, when the deciding unit 7 determines all sending side apparatuses provided in the communication confirming table 8, the determination process is completed.

The communication confirming frame can be transmitted at a predetermined period "t", or after a predetermined time from recent transmission of the data frame, or at a predetermined period when the data is not received from the asynchronous network. That is, the communication confirming frame is at least transmitted to the synchronous network at a predetermined period. Further, the predetermined period "t5", which is used for comparing it with the difference between the reception time t3 and the present time t2, is set to a value larger than a predetermined period "t" for transmitting the communication confirming frame.

In step A6, the determination of the usable reception line in the plurality of the reception lines is executed based on the following methods.

(1) Lines which recently received a data frame.

(2) Lines which recently received a data frame and have the longest term in which the abnormal state is not detected.

(3) Lines in order of the number in the numbered reception lines.

(4) Lines in which the reception lines are not determined and the data frame was received.

Figure 7:
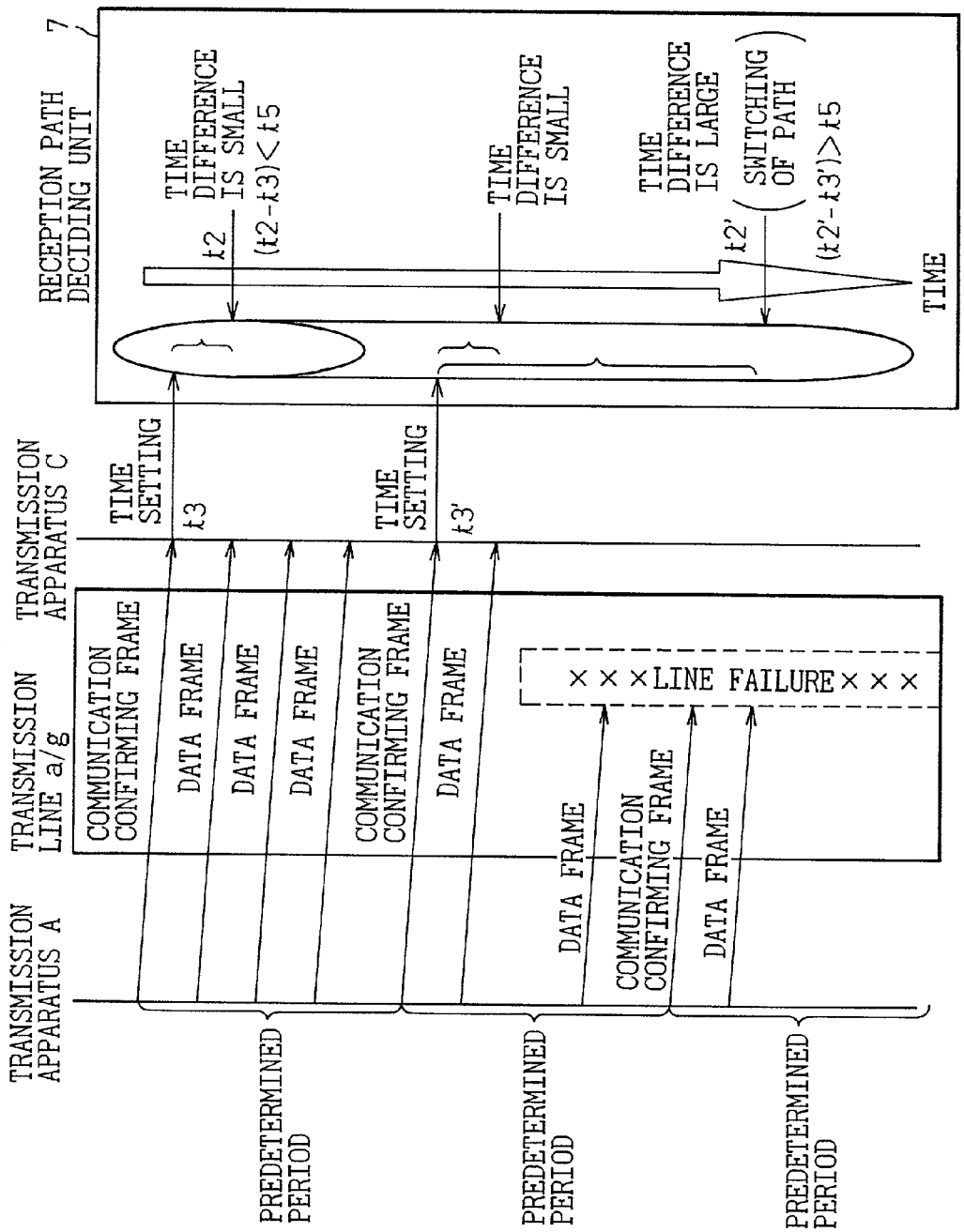
FIG. 7 is a view for explaining a communication confirming frame.

FIG. 7 is a view for explaining the communication confirming frame. For example, in the network shown in FIG. 32, i.e., in the network which connects the transmission apparatus A to the transmission apparatus C through the transmission apparatus E and the transmission lines "a" and "g" of the synchronous network, when the communication confirming frame is transmitted from the transmission apparatus A, the reception line deciding unit 7 sets the reception time "t3" of the communication confirming frame corresponding to the transmission apparatus A in the communication confirming table 8. The reception line deciding unit 7 determines whether the difference between the reception time "t3" and the present time "t2" exceeds the predetermined time "t5". In this case, when (t2−t3)<=t5, the reception line is normal, and the transmission apparatus C can normally receive the data frame from the transmission apparatus A.

When transmitting the communication confirming frame at a predetermined period, the transmission apparatus A transmits next communication confirming frame, and the transmission apparatus C receives the next communication confirming frame at the time t3'. In this case, the difference between the reception time and the present time does not exceed the predetermined time "t5". Further, when the transmission apparatus A transmits further next communication confirming frame, and when the transmission apparatus C does not receive the further next communication confirming frame and data frame due to failure of the transmission line "a" or "g", the difference between the reception time t3' and the present time T2', i.e., t2'−t3', becomes larger than the predetermined time "t5". Accordingly, the reception line deciding unit 7 determines the transmission line "a" or "g" as being abnormal, and controls the reception line selector 6 in order to switch the reception line to the line "b" or "h". Accordingly, even if the transmission/reception of the asynchronous data between the terminals continues over the predetermined time "t5", it is possible to confirm normality of reception line of the synchronous network based on the transmission/reception of the communication confirming frame. Further, it is possible to quickly detect a failure of the reception line and to switch the line to the normal line.

FIG. 8 is a view for explaining a basic structure according to a second embodiment of the present invention. The same reference numbers used in FIG. 1 are attached to the same structures in FIG. 8. Number 31 is a terminal identifying and learning table; number 32 is a reception terminal and extracting unit; number 33 is a transmission terminal identifying and extracting unit; number 34 is an identifier attaching unit; number 35 is an apparatus identifying and searching unit; number 36 is an apparatus identifying and learning unit; and number 37 is an apparatus identifying and learning table.

When the terminal data receiver 4 receives the asynchronous data such as MAC frame through the asynchronous network such as LAN, the transmission terminal identifying and extracting unit 33 extracts the destination terminal identifying information such as the destination MAC address, and informs it to the apparatus identifying and searching unit 35. The reception terminal identifying and extracting unit 32 extracts the sending side terminal identifying information such as the sending side MAC address, and stores the terminal identifying information and the reception time thereof into the terminal identifying and learning table 31.

Figure 9:
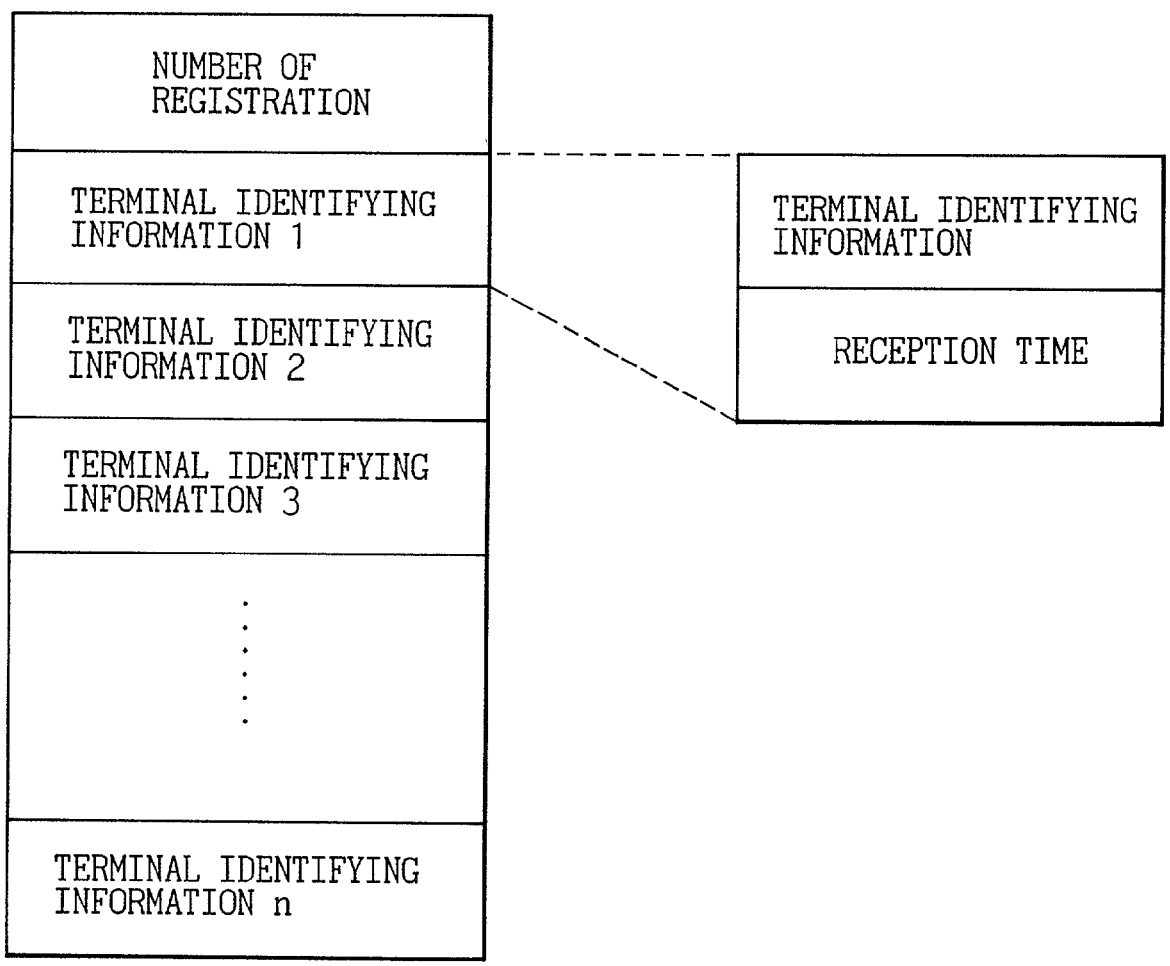
FIG. 9 is a view for explaining a terminal identifying and learning table.

FIG. 9 is a view for explaining the terminal identifying and learning table. For example, when "n" terminals are connected to the asynchronous network, as shown in FIG. 9, each of terminal identifying information 1 to n stores terminal identifying information such as the sending side MAC address and the reception time thereof. At that time, when the terminal identifying information has been stored, the reception time is updated to the most recent reception time. When another terminal identifying information is newly extracted, the terminal identifying information and the reception time thereof are stored. That is, the learning of the terminal identifying information is executed.

In FIG. 8, the reception terminal extracting unit 32 transfers the data frame, which is transferred from the transmission terminal identifying and extracting unit 33 to the identifier attaching unit 34 and the line data transmitter 2. The identifier attaching unit 34 attaches the identifier (header) to the data frame. Further, the apparatus identifying and searching unit 35 reads out the destination apparatus identifying information, which corresponds to the destination terminal identifying information such as the MAC address from the transmission terminal identifier and extracting unit 33, from the apparatus identifying and learning table 37, and transfers the destination terminal identifying information to the identifier attaching unit 34. Further, the identifier attaching unit 34 adds the destination apparatus identifying information to the identifier (header), and transfers it to the line data transmitter 2.

Further, when the identifying information corresponding to the destination terminal identifying information is not stored in the apparatus identifying table 37, the apparatus identifying and searching unit 35 informs broadcast of the information to the identifier attaching unit 34 as the destination apparatus cannot be designated.

Further, the reception terminal identifying and extracting unit 32 compares the reception time corresponding to the terminal identifying information in the terminal identifying and learning table 31 with the present time at the predetermined period. When the terminal does not receive the data frame after a predetermined time has passed, the extracting unit 32 cancels the terminal identifying information from the terminal identifying and learning table 31. Accordingly, the terminal identifying information for the terminal, in which the data frame is transmitted within the predetermined time, are held in the terminal identifying and learning table 31. Further, the terminal identifying information are canceled from the removed terminal and not-used terminal.

The terminal identifying informing frame for informing the contents set into the table 31 can be applied by the following methods.

(a) The terminal identifying informing frame can be informed for every learning of the reception terminal identifying information newly added based on the reception of the data frame.

(b) old information is searched at a predetermined time. The old information is cancelled from the terminal identifying and learning table 31, and the cancelled contents of the terminal identifying and learning table 31 are informed. In this case, the terminal identifying informing frame is transmitted at the predetermined period.

Figure 10:
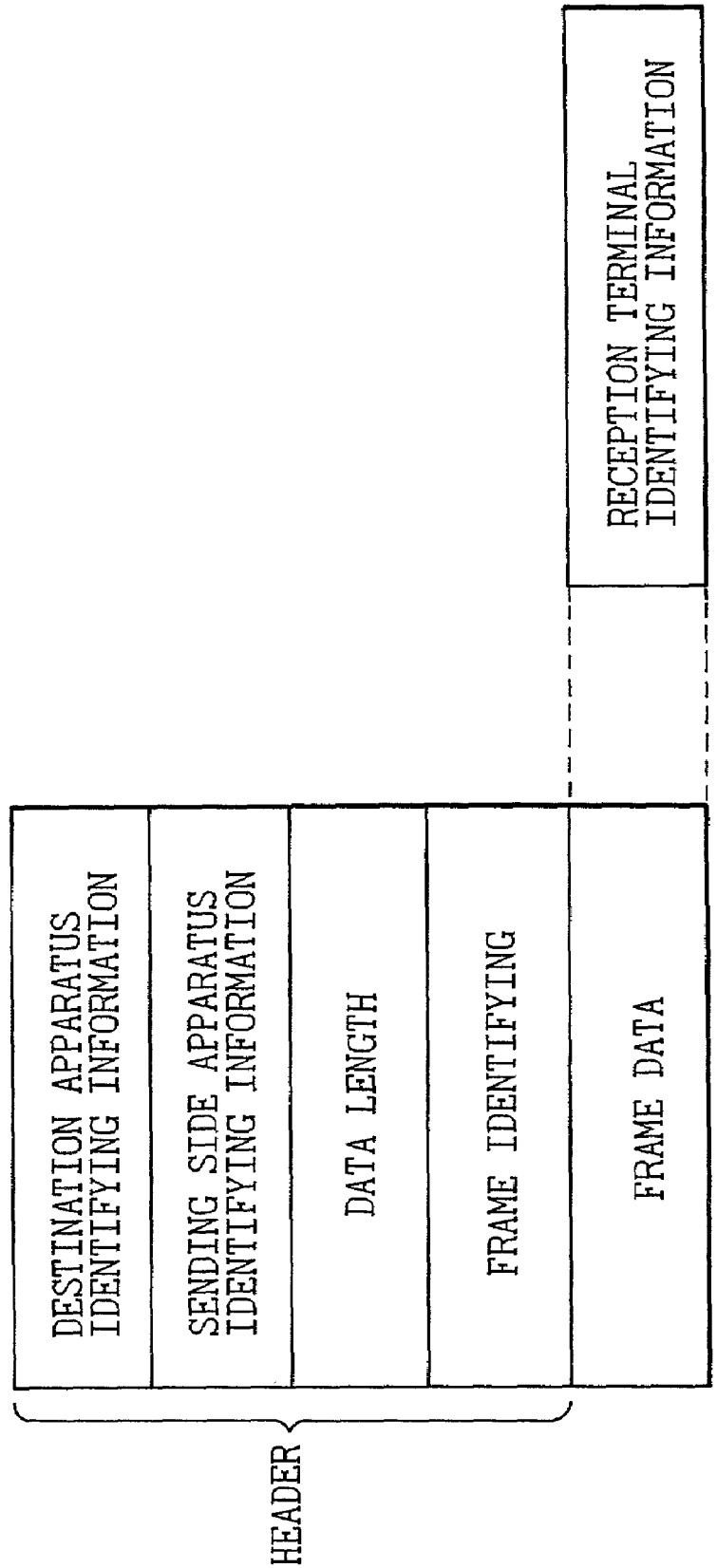
FIG. 10 is a view for explaining a terminal identifying and informing frame.

FIG. 10 is a view for explaining the terminal identifying and informing frame. As shown in FIG. 10, the terminal identifying and informing frame is formed by a header portion and frame data. The header includes the destination apparatus identifying information, the sending side apparatus identifying information, the data length and the frame identifying information. The reception terminal identifying information such as the sending side MAC address is added to the frame data. Further, based on the frame identifying information, the reception terminal identifying information is one terminal identifying and informing frame of a control frame which is different from the data frame. Still further, the destination apparatus identifying information is passed, to all transmission apparatuses connected to the synchronous network, as the broadcast address.

The line data receiver 3 includes the selecting function of the reception line of the synchronous network, and the reception line elector 6 in FIG. 1 is omitted. Further, the line data receiver 3 receives the synchronous data to its own apparatus or broadcast synchronous data, and transfers the data frame determined by the frame identifying information to the terminal data transmitter 5. Further, the line data receiver 3 passes the terminal identifying and informing frame to the apparatus identifying and learning unit 36.

Figure 11:
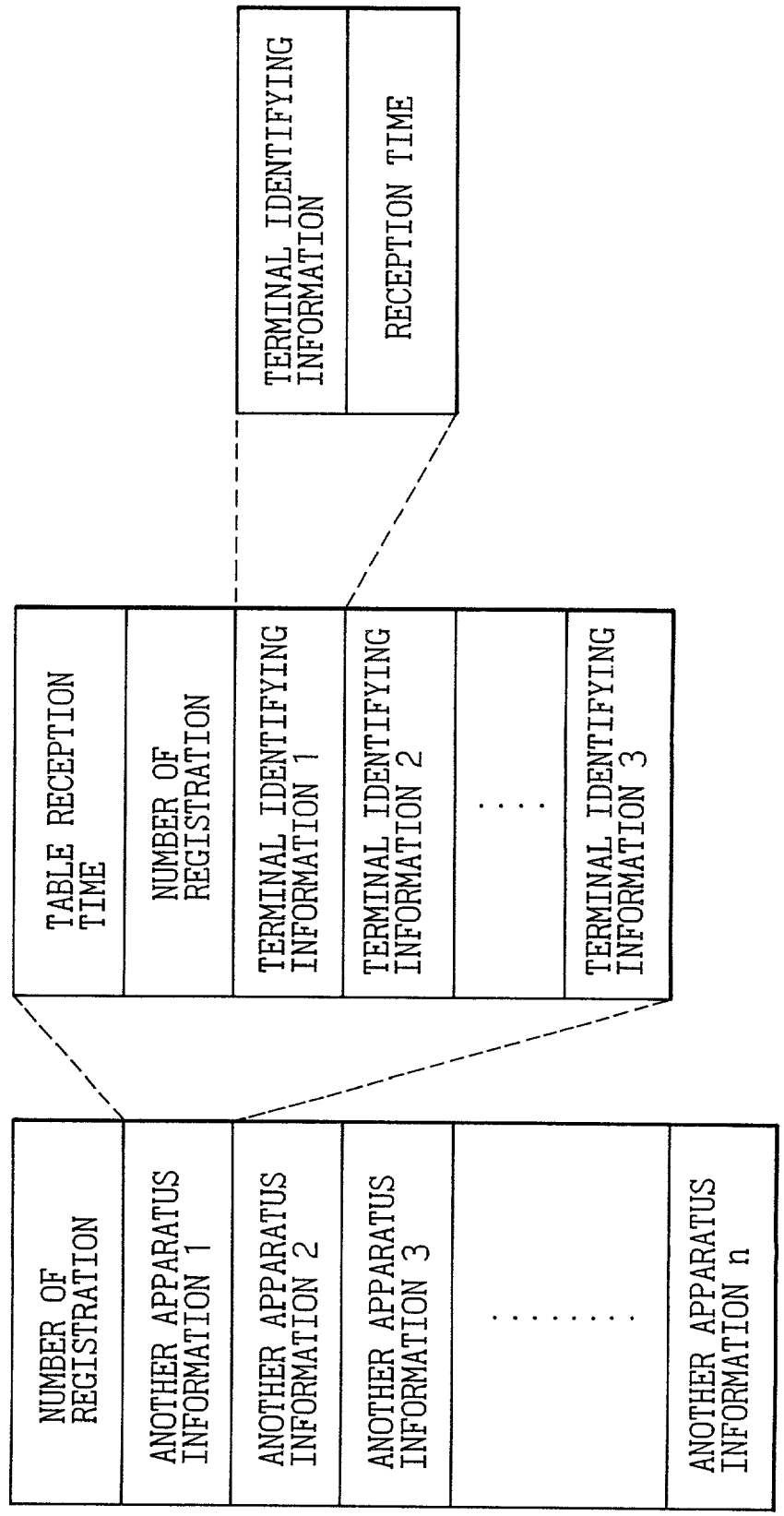
FIG. 11 is a view for explaining an apparatus identifying and learning table.

FIG. 11 is a view for explaining the apparatus identifying and learning table. The apparatus identifying and learning unit 36 executes update control of the apparatus identifying and learning table 37 in FIG. 37, based on the reception terminal identifying information informed by the terminal informing frame. That is, the apparatus identifying and learning table 37 stores the terminal identifying information 1 to "n" each corresponding to the transmission apparatus informed by the terminal informing frame, and stores the reception time at that time. In this case, in FIG. 8, it is possible to change the connection between the transmission terminal identifying and extracting unit 33 and the reception terminal identifying and extracting unit 32 so as to connect the unit 32 after the unit 33.

Figure 12:
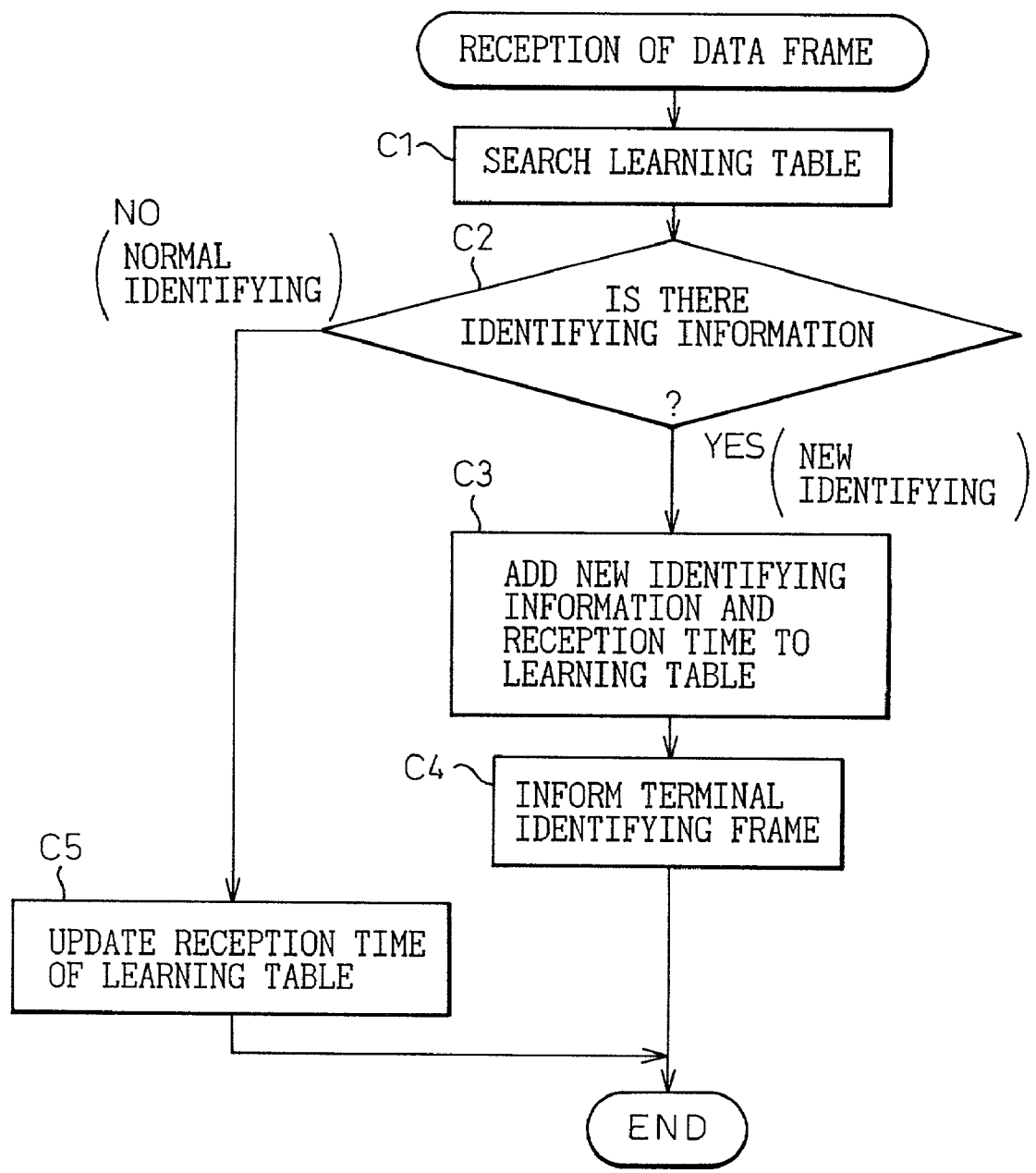
FIGS. 12 and 13 are process flowcharts in a reception terminal identifying and extracting unit.
Figure 13:
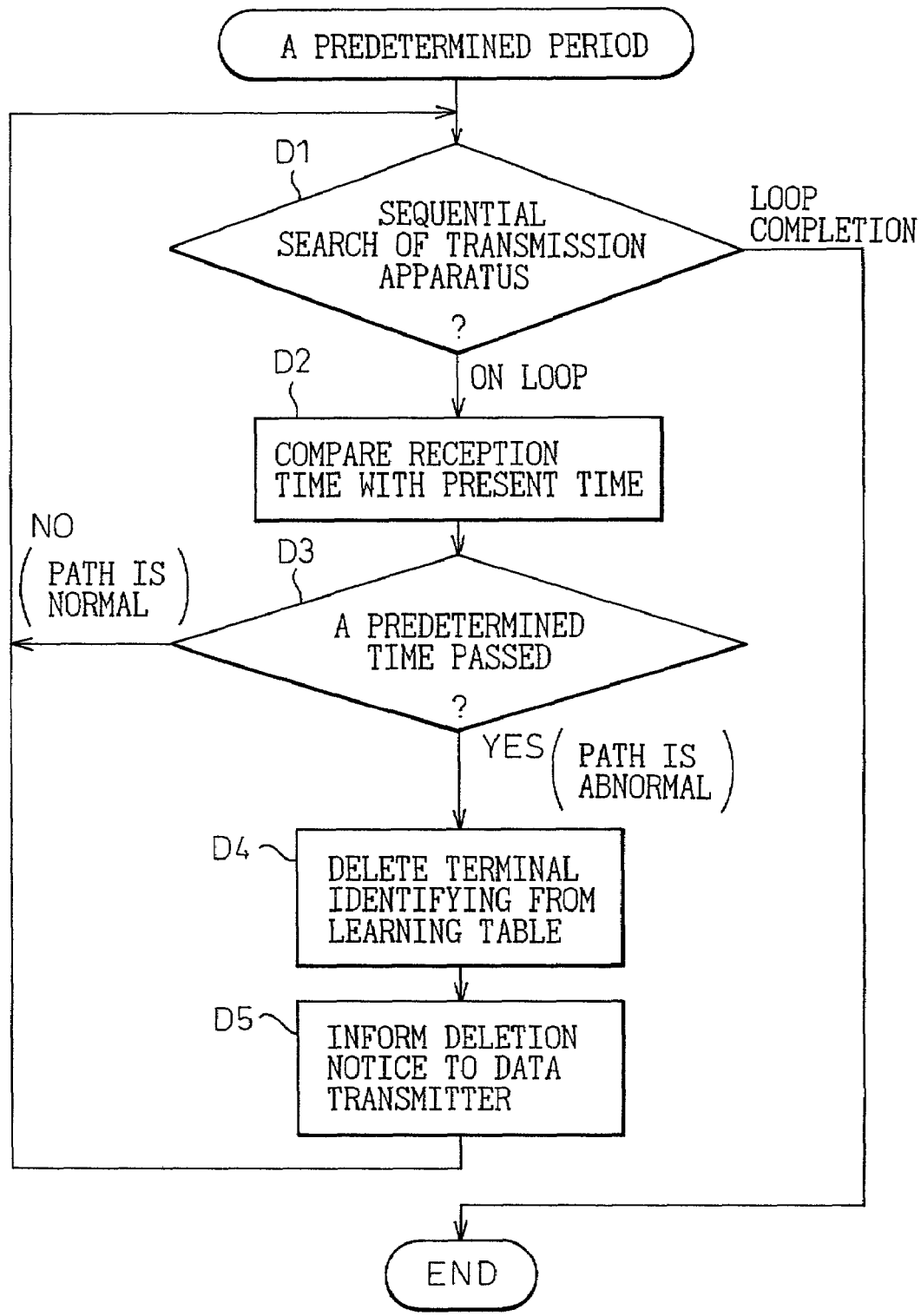

FIGS. 12 and 13 are process flowcharts for the reception terminal identifying and extracting unit 32. The reception terminal identifying and extracting unit 32 receives the data frame from the terminal, and searches the terminal identifying and learning table 31 for the sending side terminal identifying information in the table 31 (C1). Next, the unit 32 determines whether the sending side terminal identifying information exists in the table 31 (C2). When there is no sending side terminal identifying information (YES in step C2), since the received identifying information is new, the new identifying information is added to the terminal identifying and learning table 31 with the reception time of the new identifying information (C3). Further, the unit 32 instructs transmission of the terminal identifying and informing frame to the line data transmitter 2 (C4). Further, as explained above, the reception terminal identifying and extracting unit 32 forms the terminal identifying and informing frame having the identifier (header portion) of the identifier attaching unit 34 using the contents of the table 31, and transmits the frame from the line data transmitter 2 to the line of the synchronous network. Further, in step C2, when there is identifying information in the learning table 31, the identifying and extracting unit 32 updates the reception time in the learning table 31.

Still further, as shown in FIG. 13, the identifying and extracting unit 32 forms the loop for sequentially searching the terminals stored in the identifying and learning tale 31 at a predetermined period (D1), and obtains the difference between the present time and the reception time corresponding to each terminal (D2). Next, the identifying and extracting unit 32 determines whether the difference of time exceeds the predetermined period (D3). When the difference in time does not exceed the predetermined time (NO in step D3), the identifying and extracting unit 32 determines the path as being normal, and the process moves to the step D1. On the other hand, when the difference of time exceeds the predetermined period, the unit 32 determines the path as being abnormal, and the unit 32 deletes the terminal identifying and information from the identifying and learning table 31 (D4). Further, the unit 32 instructs transmission of the terminal identifying and informing frame to the line data transmitter 2 (D5), and the process moves to the step D1.

For example, in the network structure shown in FIG. 30, the present invention has the following advantages. That is, when transmitting or receiving the data between the terminal T1 connected to the apparatus A through the LAN and the terminal T5 connected to the apparatus C through the LAN, and when the apparatus A receives the fist data frame from the terminal T1, the transmission apparatus A stores the sending side terminal identifying information such as the sending side MAC address with the reception time thereof into the above-mentioned terminal identifying and learning table 31. As a result, the transmission apparatus A can recognize the terminal T1 being connected to the terminal A itself, and passes it, as the terminal identifying and informing frame, to each transmission apparatus on the network.

Since the transmission apparatus A, which received the data frame to be transmitted to the terminal T5 from the terminal T1, has not yet learned the transmission apparatus to which the terminal T5 of the destination is connected, the apparatus A broadcasts this data frame. The transmission apparatuses B and C in FIG. 30 store the fact that the terminal T1 is connected to the apparatus A into the transmission identifying and learning table 37 using the terminal identifying and informing frame. That is, the identifying information of the terminal T1 and the reception time of the terminal identifying and informing frame are stored in the area corresponding to the apparatus A as shown in FIG. 11. Further, the transmission apparatuses B and C transmit the received data frame to the LAN, and the terminal T5 can receive the data frame based on the destination terminal identifying information such as destination MAC address. At that time, useless traffic occurs in the transmission apparatus B.

Next, the terminal T5 transmits the data frame to the terminal T1, the transmission apparatus C stores the sending side terminal identifying information such as the sending side MAC address with the reception time thereof into the terminal identifying and learning table 31 so that the apparatus C recognizes as the terminal T5 being connected to its own apparatus, i.e. the apparatus C. Further, the apparatus C informs the fact, that the terminal T5 is connected to the apparatus C and to each transmission apparatus on the network, using the terminal identifying and informing frame. As a result, the apparatus C stores the fact that the terminal T5 is connected to its own apparatus, in the identifying and learning table 37 in each apparatus. Further, since the fact that the terminal T1 is connected to the apparatus A has been learned in the identifying and learning table 37 of the apparatus C, the identifying information of the apparatus A is inserted to the data frame transmitted to the terminal T1 from the terminal T5, as the destination apparatus identifying information into the header, and transmitted to the apparatus A.

Accordingly, the transmission apparatus A identifies the data frame as it being transmitted to its own apparatus based on the destination apparatus identifying information, and can transmit the data frame to the connected terminal T1 through the LAN. At that time, since the apparatus B does not receive the data frame because the data frame being not transmitted to its own apparatus, i.e. the apparatus B, the useless traffic does not occur in the data transmission. Further, since the terminal identifying and informing frame is transmitted corresponding to addition, deletion or change of the address of the terminal connected to the apparatus, and corresponding to the predetermined period, each apparatus can recognize the terminal connected to another apparatus so that it is possible to transmit the data frame adding destination apparatus identifying information corresponding to the destination terminal identifying information, and to avoid a useless reception process due to reception of the data frame from the apparatus which is not a destination.

Figure 14:
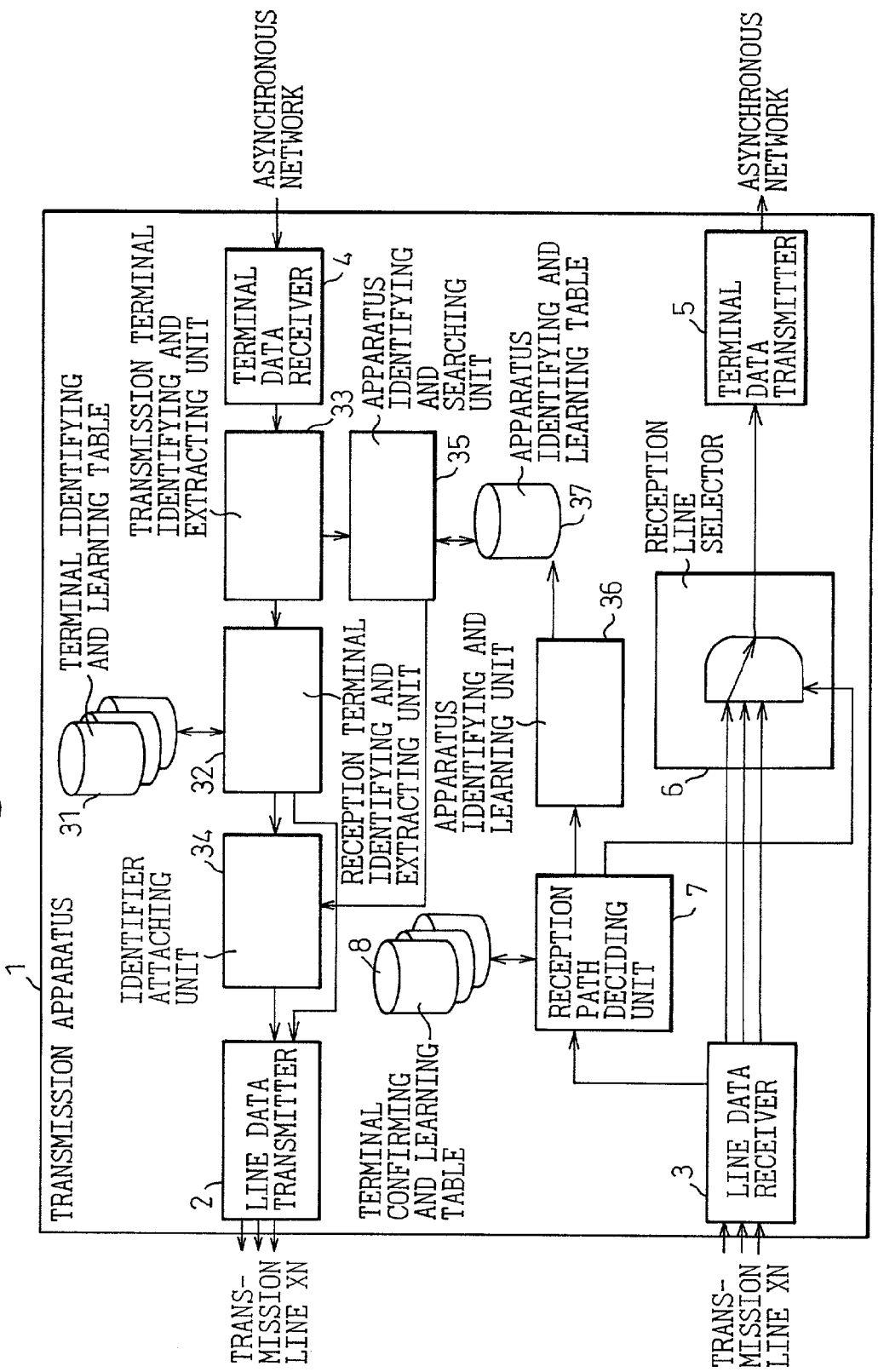
FIG. 14 is a view for explaining a third embodiment of the present invention.

FIG. 14 is a view for explaining the third embodiment of the present invention. The same numbers are attached to FIG. 14 for the same components used in FIGS. 1 to 8. In this embodiment, it is possible to inform confirmation of normality of the reception line and identifying information of the terminal connected to the apparatus, under the situation that the terminal identifying and informing frame is also used as the communication confirming frame. The communication confirming table 8 has the structure shown in FIG. 4, and terminal identifying and learning table 31 has the structure shown in FIG. 9. Further, the apparatus identifying and learning table 37 has the structure shown in FIG. 11.

The terminal data receiver 4 receives the data frame through an asynchronous network such as a LAN from a terminal (not shown). The transmission terminal identifying and extracting unit 33 extracts the transmission terminal identifying information such as destination MAC address added to the data frame and passes it to the apparatus identifying and searching unit 35. The apparatus identifying and searching unit 35 searches the apparatus identifying and learning table 37, reads the destination apparatus identifying information corresponding to the transmission terminal identifying information, and transfers it to the identifier attaching unit 34.

The reception terminal identifying and extracting unit 32 extracts reception terminal identifying information, such as a sending side MAC address added to the data frame, stores the identifying information with the reception time thereof into the terminal identifying and learning table 31, and controls so as to transmit the terminal identifying and informing frame from the line data transmitter 2. The identifier attaching unit 14 adds the identifier to the data frame, inserts the destination apparatus identifying information informed by the identifying and searching unit 35, and transmits the information as the synchronous data from the line data transmitter 2.

The terminal identifying and informing frame that is transmitted to all transmission apparatuses on the network can be applied to the following notification methods.

(A) The line data transmitter 2 informs the terminal identifying and informing frame to all apparatuses when the transmitter 2 newly learns the reception terminal identifying information added upon reception of the data frame.

(B) The line data transmitter 2 informs the terminal identifying and informing frame to all apparatuses when the transmitter 2 deletes the reception terminal identifying information in which the predetermined time passed from the reception time at the predetermined period.

(C) The line data transmitter 2 informs the terminal identifying and informing frame to all apparatuses when the transmitter 2 does not newly learn the reception terminal identifying information without occurrence of the conditions of item (B) at the predetermined period.

The line data receiver 3 receives the synchronous data through another transmission apparatus, and transfers the data frame to the reception line selector 6. Further, the line data receiver 3 transmits terminal identifying and informing frame to the reception line deciding unit 7 and the apparatus identifying and learning unit 36. The reception line deciding unit 7 processes the terminal identifying and informing frame as well as the above-mentioned communication confirming frame, and stores the reception time and the like corresponding to each reception line. Further, the deciding unit 7 determines whether the difference between the reception time and the present time exceeds the predetermined time for every predetermined period. When the difference exceeds the predetermined time, the deciding unit 7 determines a failure of the reception line, and instructs switching of the reception line to the reception line selector 6.

Further, the apparatus identifying and learning unit 36 stores the identifying information between the transmission apparatus for the terminal identifying and informing frame and the terminal connected to the above apparatus, into the apparatus identifying and learning table 37. Accordingly, the apparatus identifying and learning table 37 includes the identifying information between all terminals which are operable and connected to the network and the apparatus in which each terminal is connected.

Figure 15:
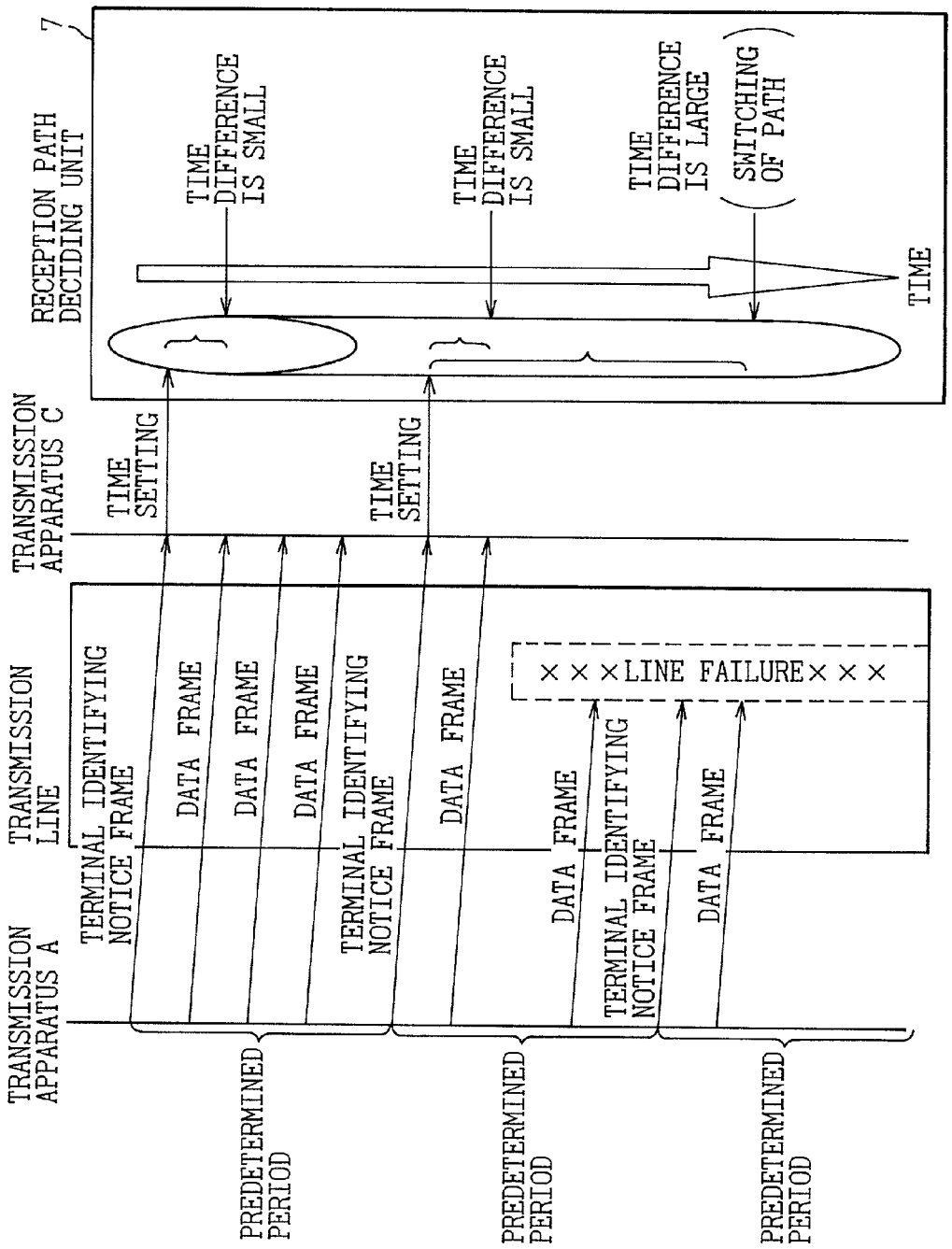
FIG. 15 is a view for explaining a terminal identifying and informing frame.

FIG. 15 is a view for explaining the terminal identifying and informing frame. The data frames are transmitted from the transmission apparatus A to the transmission apparatus C through the transmission line. Further, the terminal identifying frame is also transmitted from the apparatus A to the apparatus C through the transmission line at a predetermined period. When the apparatus A transmits the terminal confirming and informing frame, the reception line deciding unit 7 of the apparatus C stores the reception time corresponding to each line into the communication confirming table 8, and compares the present time and the reception time of the terminal confirming and informing frame at the predetermined period. When the time difference is small, the deciding unit 7 determines the reception line as being normal.

After the above steps, the apparatus A transmits the terminal identifying and informing frame to the apparatus C at the predetermined period. The apparatus C receives the terminal identifying and informing frame and compares the present time with the reception time at the predetermined period. When the time difference is small, the deciding unit 7 determines the reception line as being normal. On the other hand, the apparatus C cannot receive the data frame and the terminal identifying and informing frame, the apparatus C compares the present time and the reception time at the predetermined period. As a result, the apparatus C determines the reception line as being abnormal (i.e. line failure) because of the large time difference. Further, the reception line deciding unit 7 controls the reception line selector 6 and switches the reception line. Accordingly, it is possible to receive the data frame through the normal transmission line. That is, it is possible to utilize the terminal identifying and informing frame in order to confirm normality of the reception line, as well as the communication confirming frame shown in FIG. 7.

Figure 16:
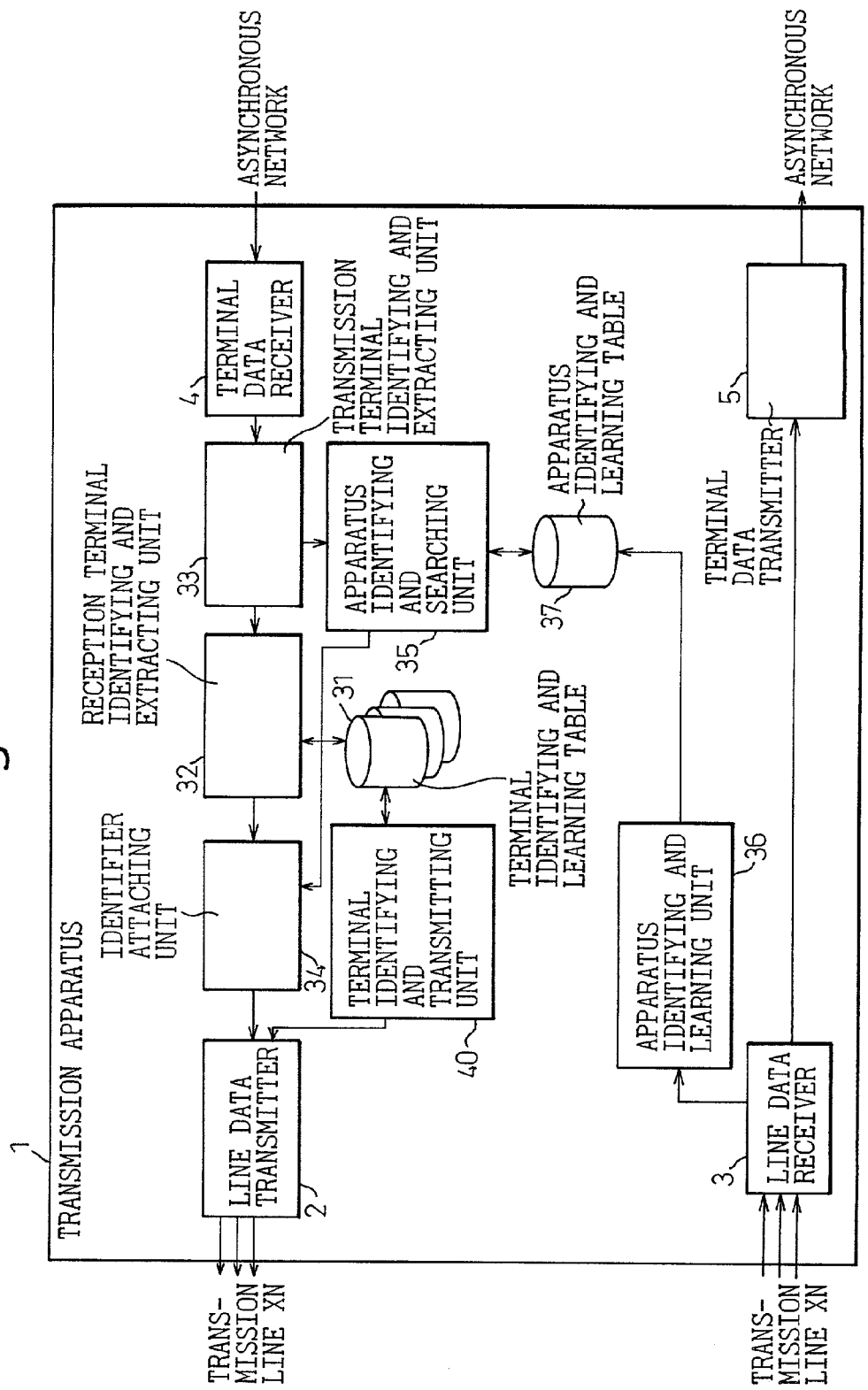
FIG. 16 is a view for explaining a fourth embodiment of the present invention.

FIG. 16 is a view for explaining a fourth embodiment of the present invention. The same numbers used in this drawing denote the same structures as shown in FIGS. 1 to 8. In FIG. 16, number 40 denotes a terminal identifying and transmitting unit which is added to the structure shown in FIG. 8. The terminal identifying and transmitting unit 40 controls transmission of the contents of the terminal identifying and learning table 31 from the line data transmitter 2, as the terminal identifying and informing frame. Accordingly, the reception terminal identifying and extracting unit 32 does not include the function of the transmission control of the terminal identifying and informing frame.

Further, the terminal identifying and learning table 31 and the apparatus identifying and learning table 37 have structures shown in FIGS. 9 and 11. The reception terminal identifying and extracting unit 32 extracts the terminal identifying information such as a sending side MAC address which is attached to the data frame from the terminal, through an asynchronous network such as a LAN, and stores the terminal identifying information with the reception time thereof into the terminal identifying and learning table 31.

Further, the transmission terminal identifying and extracting unit 33 extracts the terminal identifying information such as destination MAC address which is attached to the data frame, and informs the terminal identifying information to the transmission terminal identifying and searching unit 35. The searching unit 35 reads the identifying information of the destination apparatus corresponding to the extracted terminal identifying information from the apparatus identifying and learning table 37, and transmits the read identifying information to the identifier attaching unit 34. The identifier attaching unit 34 inserts the destination apparatus identifying information into the identifier (i.e. header) adding to the data frame, and transmits the destination apparatus identifying information to each transmission line of the synchronous network through the line data transmitter 2.

Further, the terminal identifying and transmitting unit 40 compares the reception time corresponding to the terminal identifying information stored in the learning table 31 with the present time at the predetermined period. When the time difference exceeds the predetermined time, since the transmitting unit 40 does not receive the data frame passing the predetermined time, the transmitting unit 40 deletes the terminal identifying information from the terminal identifying and learning table 31.

Further, the line data receiver 3 receives the information through a plurality of transmission lines XN, and transmits the data frame from the terminal data transmitter 5 to the terminal (not shown) through an asynchronous network such as a LAN. When the receiver 3 receives the terminal identifying and informing frame from the transmission line, the receiver 3 transmits it to the apparatus identifying and learning unit 36. The learning unit 36 stores the terminal identifying information corresponding to the apparatus informed by the terminal identifying and informing frame, into the apparatus identifying and learning table 37. In this case, the line data receiver 3 includes a selecting function of the reception line as well as the structure shown in FIG. 8. When the receiver 3 detects the failure of the transmission line, the receiver 3 switches the failure line to the normal line.

Figure 17:
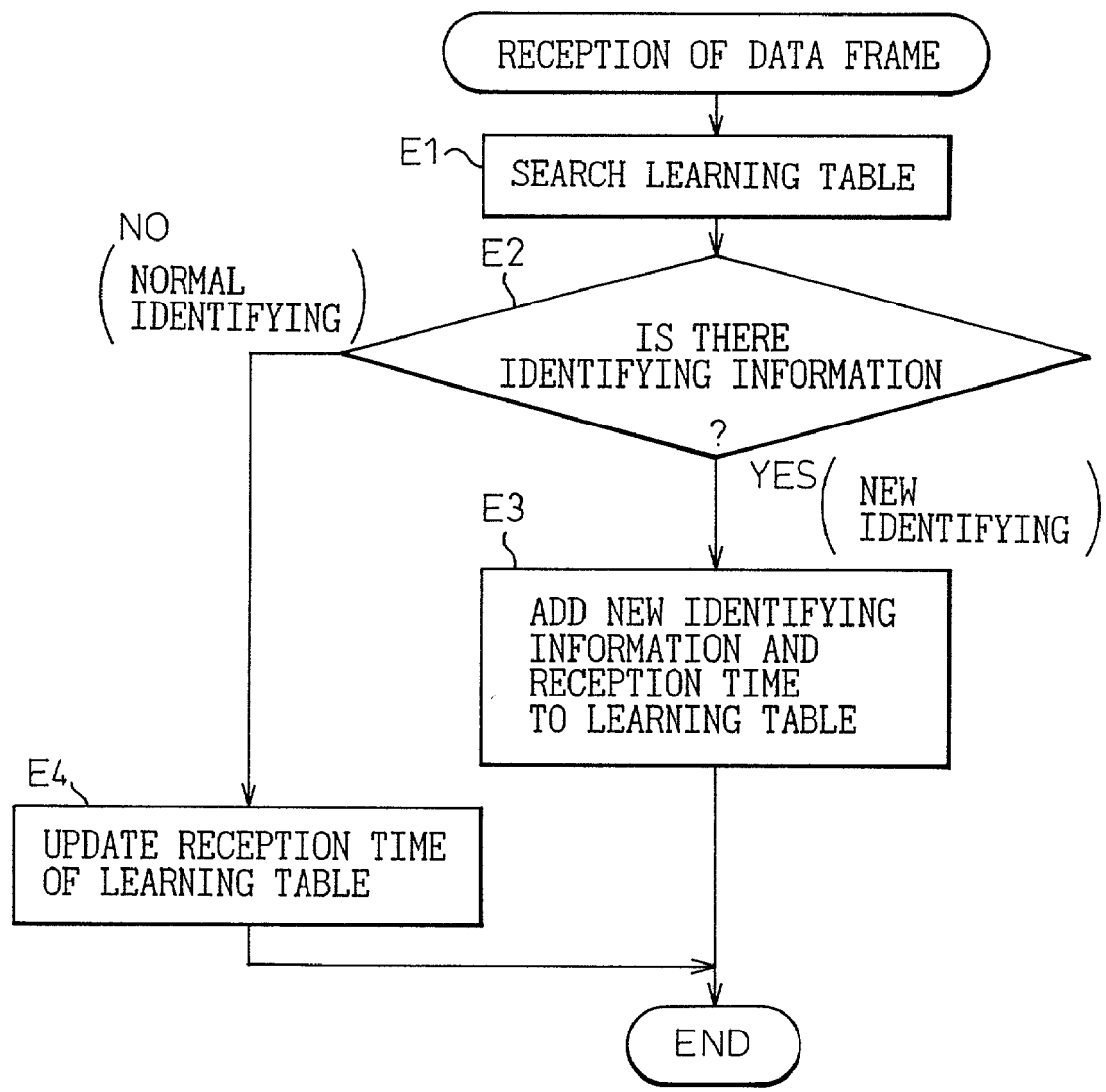
FIG. 17 is a flowchart for explaining terminal identifying and learning processes in which the reception terminal identifying and extracting unit controls the terminal identifying and learning table.

FIG. 17 is a flowchart for explaining terminal identifying and learning processes in which the reception terminal identifying and extracting unit 32 controls the terminal identifying and learning table 31. When the extracting unit 32 receives the data frame through the asynchronous network, the extracting unit 32 searches the sending side terminal identifying information such as sending side MAC address extracted from the data frame in the terminal identifying and learning table 31 (E1), and determines whether the extracted identifying information exists in the table 31 (E2). When the extracted identifying information does not exist in the table 31, the extracting unit 32 determines as the extracted identifying information being a new terminal identifying information, and stores the terminal identifying information with the reception time thereof into the table 31 (E3). When the extracted identifying information exists in the table 31, since it is a known terminal identifying information, the extracting unit 32 updates the reception time corresponding to the identifying information stored in the table 31 (E4).

Figure 18:
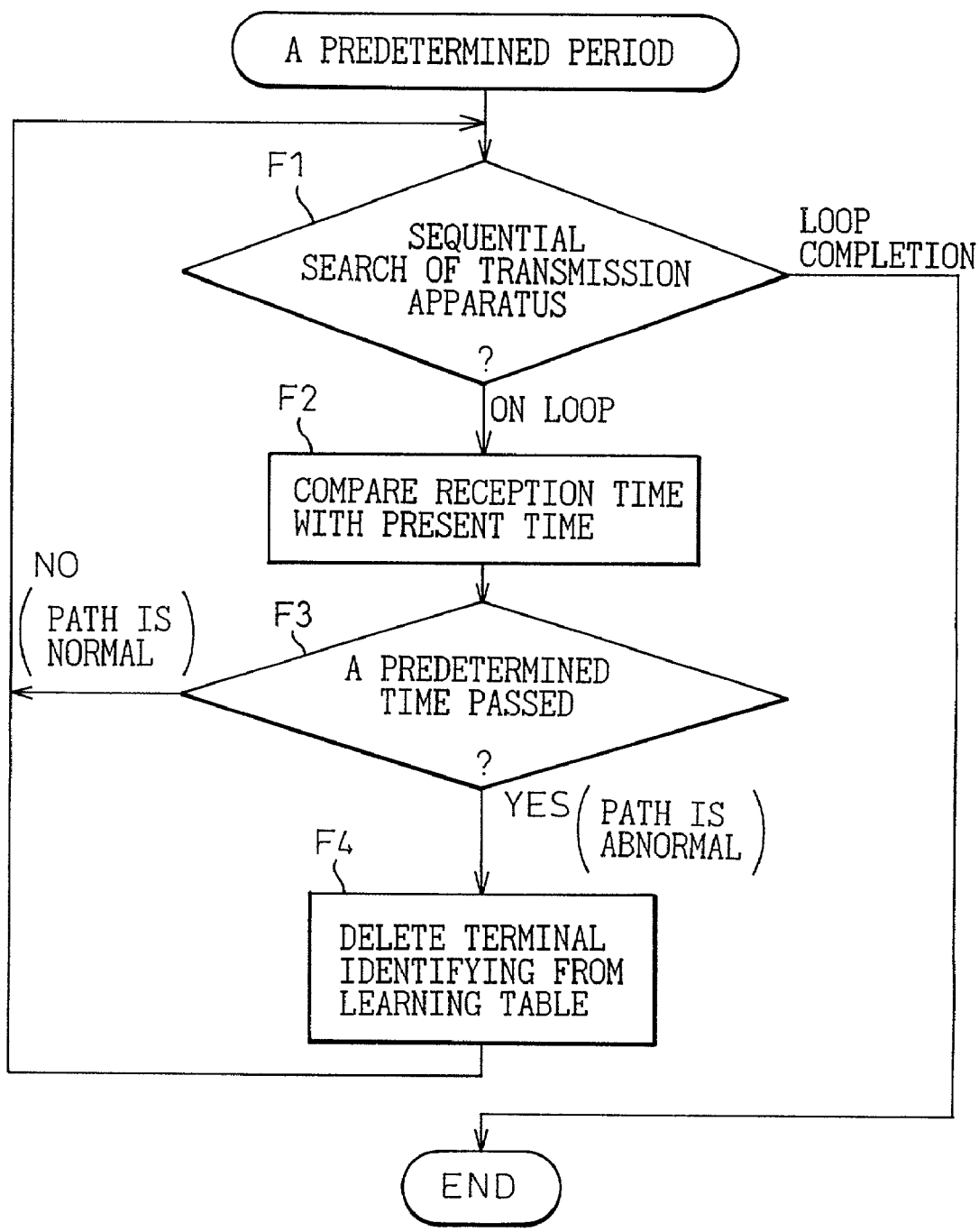
FIG. 18 is a flowchart for explaining deletion of the terminal identifying information.

FIG. 18 is a flowchart for explaining deletion of the terminal identifying information. The reception terminal identifying and extracting unit 32 sequentially searches the terminal identifying information stored in the terminal identifying and learning table 31 (F1), and obtains the difference between the reception time corresponding to the searched identifying information and the present time (F2). The extracting unit 32 determines whether the difference exceeds the predetermined time (F3). When the difference does not exceed the predetermined time, the extracting unit 32 determines the reception line as being normal, and the process moves to the step F1. When the difference exceeds the predetermined time, the extracting unit 32 determines the reception line as being abnormal, and deletes the identifying information corresponding to the abnormal line from the learning table 31 (F4). The process moves to the step F1.

The terminal identifying and transmitting unit 40 broadcasts the contents of the learning table 31 at the predetermined period as the terminal identifying and informing frame. The line data receiver 3 receives this identifying and informing frame from the receiver 3, and transfers it to the apparatus identifying and learning unit 36. The learning unit 36 holds the identifying information corresponding to the transmission apparatus, and updates the reception time. The learning unit 36 compares the reception time with the present time at the predetermined period. When the difference exceeds the predetermined time, the learning unit 36 deletes the identifying information from the learning table 31.

Figure 19:
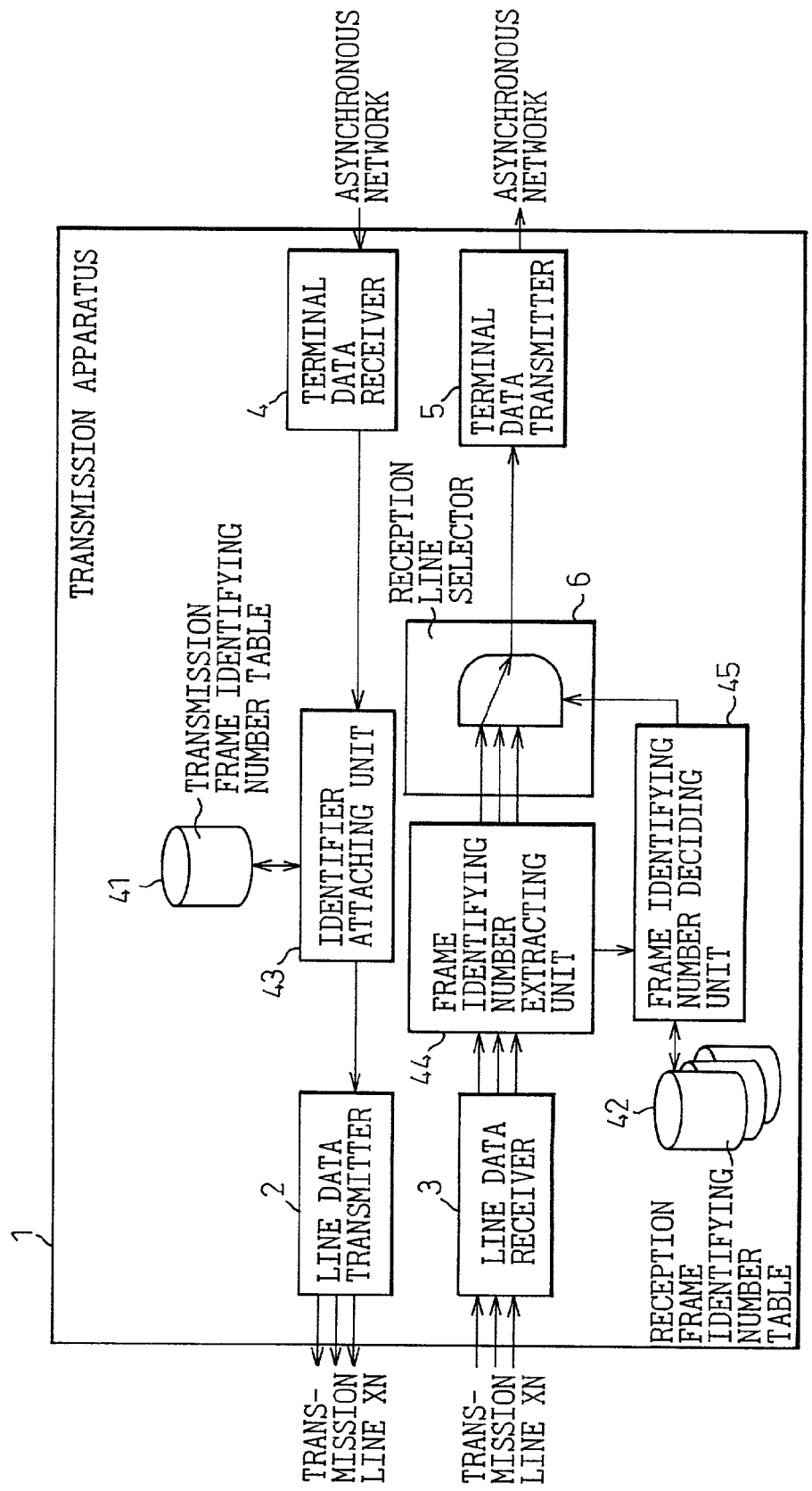
FIG. 19 is a view for explaining a fifth embodiment of the present invention.

FIG. 19 is a view for explaining a fifth embodiment of the present invention. In the drawing, number 1 is a transmission apparatus, number 2 is a line data transmitter, number 3 is a line data receiver, number 4 is a terminal data receiver, number 5 is a terminal data transmitter, and number 6 is a reception line selector.

Further, number 41 is a transmission frame identifying number table, number 42 is a reception frame identifying number table, number 43 is an identifier attaching unit, 44 is a frame identifying number extracting unit, and number 45 is a frame identifying number deciding unit. In this structure, the line data transmitter 2, the line data receiver 3, the terminal data receiver 4, the terminal data transmitter 5 and the selector 6 have the same functions as explained in the above embodiments.

The terminal data receiver 4 receives the data frame through the asynchronous network such as LAN from the terminal (not shown), and the identifier attaching unit 43 adds the identifier (i.e. header) to the data frame and a frame sequence number stored in the table 41. Further, the line data transmitter 2 converts the asynchronous data to the synchronous data, and transmits the synchronous data to each transmission line of the synchronous network.

Figure 20:
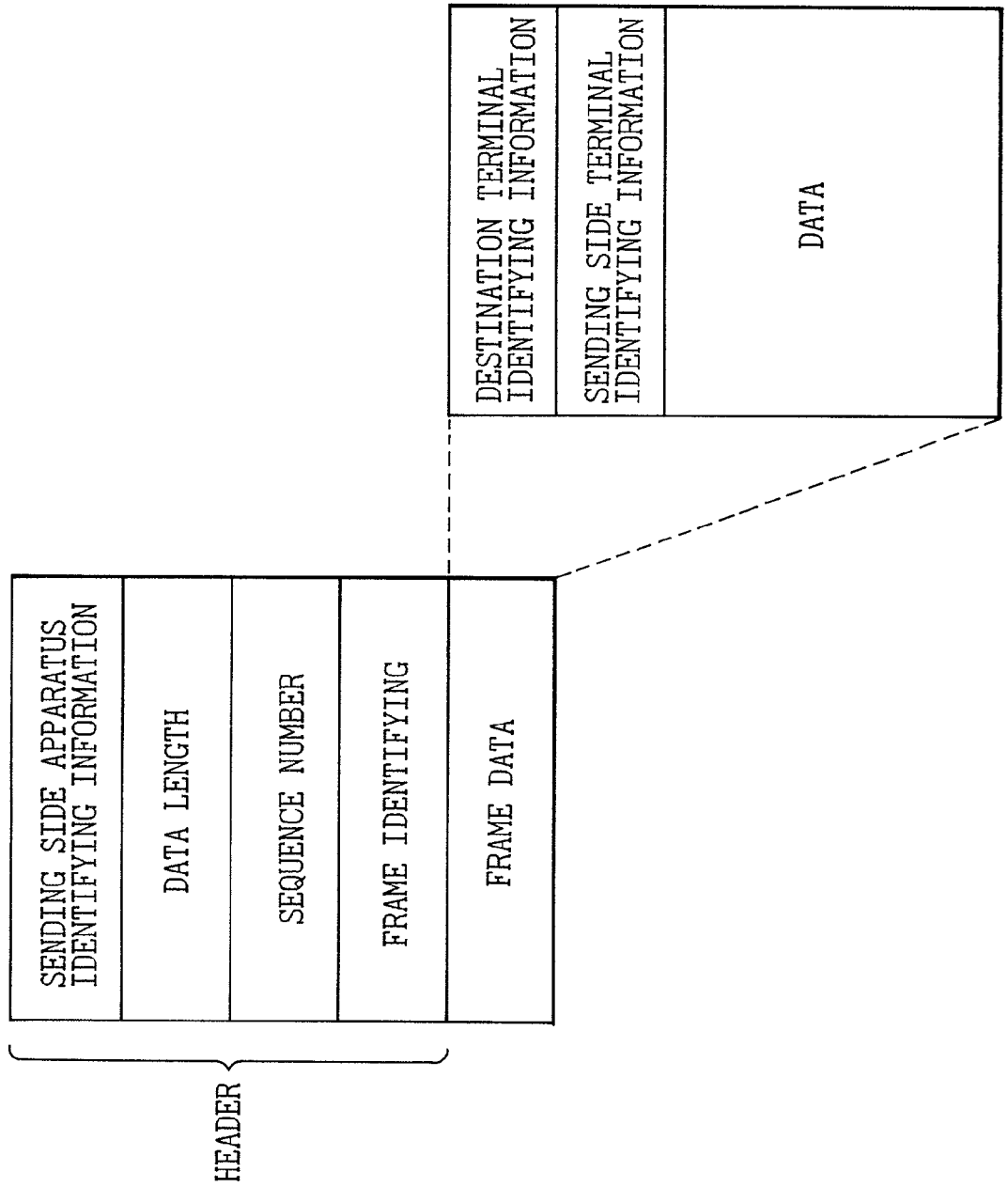
FIG. 20 is a view for explaining the frame structure.

FIG. 20 is a view for explaining a frame structure. The frame includes the header portion and the data frame. Further, the header includes the sending side apparatus identifying information, the data length, the sequence number, and the frame identifying information for identifying either the data frame or the control frame. The data frame includes the destination terminal identifying information such as the destination MAC address, the sending side terminal identifying information such as the sending side MAC address, and the data transmitted and received between terminals.

The identifier attaching unit 43 inserts the sequence number which is managed by the transmission frame identifying number table 41, to the identifier (header) attached to the data frame, and transmits it to the line data transmitter 2 in order to transmit the synchronous data such as a SDH frame to each line of the synchronous network. Further, the line data receiver 3 separates the data frame from the synchronous data from each transmission line. The frame identifying number and extracting unit 44 extracts the sequence number of the identifier (header), and informs it to the frame identifying number deciding unit 45.

The deciding unit 45 updates the reception frame identifying number table 42. When the sequence number is not normally incremented, the deciding unit 45 determines as the reception being abnormal, and instructs the switching to the reception line selector 6. Accordingly, the selector 6 switches the reception line to the normal line and transmits the data frame to the terminal data transmitter 5. The terminal data transmitter 5 transmits the data frame to the terminal (not shown) through the asynchronous network such as the LAN.

FIG. 21A is a view for explaining the transmission frame identifying number table, and FIG. 21B is a view for explaining the reception frame identifying number table. As shown in FIG. 21A, the transmission frame identifying number table 41 stores the transmission frame sequence number. The identifier attaching unit 43 reads the sequence number, and increments by +1 when inserting the sequence number to the identifier. Further, as shown in FIG. 21B, the reception frame identifying number table 42 stores the reception frame sequence numbers corresponding to transmission apparatuses #1 to #n.

The frame identifying number deciding unit 45 compares the sequence number extracted by the extracting unit 44 with the reception frame sequence number stored in the table 42. When the present sequence number received from the same apparatus is incremented from the just previous sequence number, the deciding unit 45 determines as the sequence number being normal. When the present sequence number is not incremented from the just previous sequence number, the deciding unit 45 determines the sequence number as being abnormal.

Figure 22:
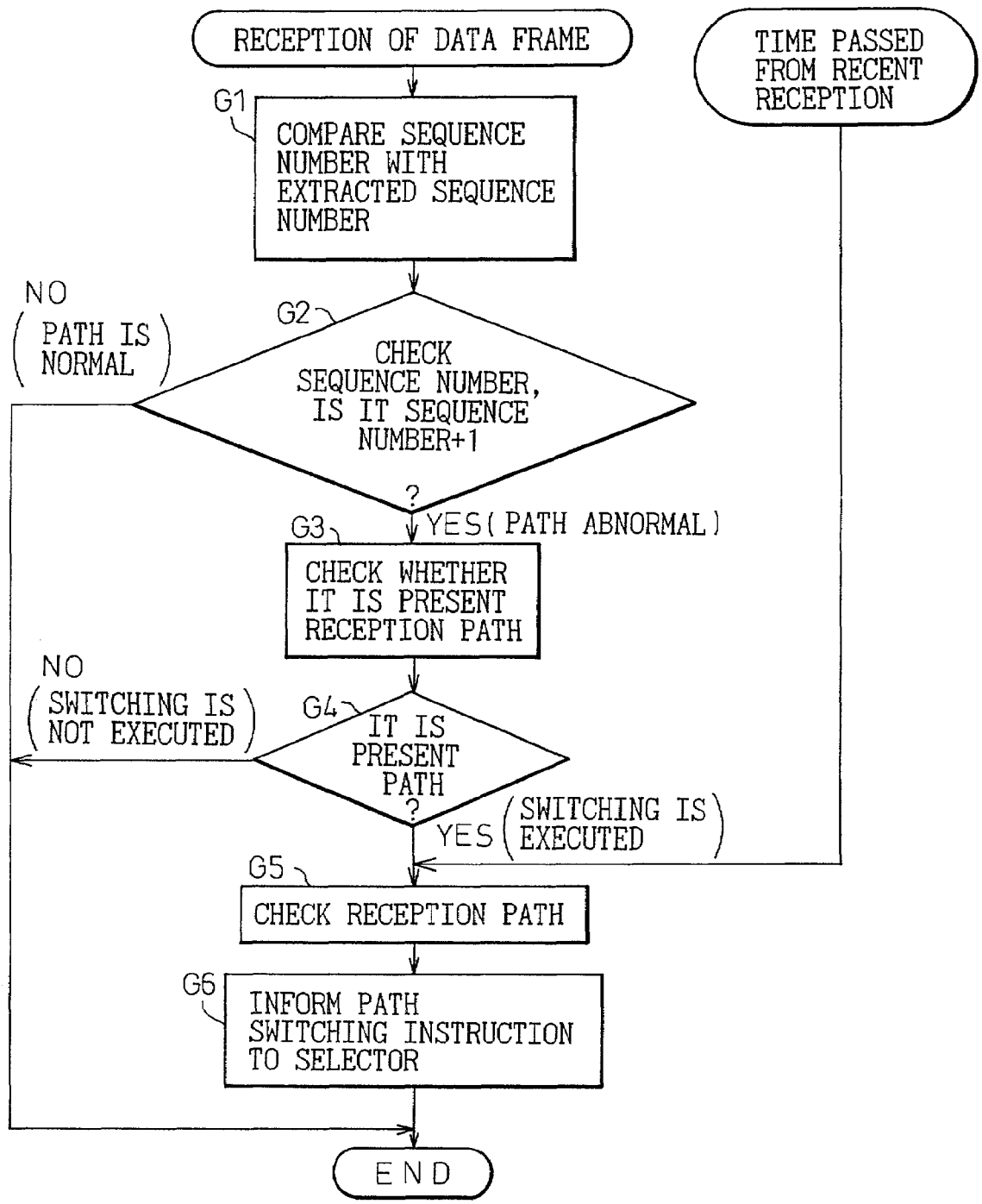
FIG. 22 is a process flowchart for determination of sequence number.

FIG. 22 is a process flowchart for determination of a sequence number. The data receiver 3 receives the data frame, and the extracting unit 44 extracts the frame identifying information and the sequence number which are inserted into the identifier (header). The deciding unit 45 compares the extracted sequence number with the sequence number of the data frame received from the just previous sending side apparatus held in the table 42 (G1). Further, the deciding unit 45 determines as to whether the sequence number of the data frame just received is incremented from the just previous sequence number by +1 (G2).

When the sequence number is incremented by +1, the deciding unit 45 determines the reception line as being normal, and the process is completed. On the other hand, when the sequence number is not incremented by +1, the deciding unit 45 determines the reception line as being abnormal because, if one data frame is missed, the reception sequence number reaches +2. Further, the deciding unit 45 checks as to whether the reception line of the data frame is the present reception line (G3). As a result, the deciding unit 45 determines whether the reception line is the present line (G4). When it is not the present line, the deciding unit 45 completes the process. When it is the present line, the deciding unit 45 determines the selectable reception line from plural reception lines (G5), and instructs switching the reception line to the selected reception line (G6).

The deciding unit 45 includes a timer means corresponding to each reception line. When the data frame is not received after the predetermined time is passed, the deciding unit 45 determines the reception line as being abnormal (i.e. occurrence of line failure), determines the selectable reception line from plural reception lines, and instructs switching the reception line to the selected reception line to the selector 6.

FIGS. 23A and 23B are views for explaining switching of the reception line. The deciding unit 45 determines the frame sequence number as follows. As shown in FIG. 23A, in the data frames each having the sequence number 1 to 10, it is assumed that the data frame having the sequence number 6 is lacked. When the data receiver 3 receives the data frame having the sequence number 7 after the just previous sequence number 5, the deciding unit 45 determines as the sequence number is not satisfied by the condition, i.e. increment of +1, and instructs switching the reception line to another line to the selector 6.

Further, as shown in FIG. 23B, if plural data frames having the sequence numbers 6 to 10 are not present, the deciding unit 45 starts the timer, and instructs switching the reception line to another line to the selector 6 after the timer reaches time-out. In general, the terminal has a function of re-transmission in order to re-transmit the data frames because of occurrence of missing frames and transmission errors, and it is possible to recover the lacking data frames in the reception side. That is, the timer is reset and started for each reception of the data frame. When the timer is not reset from the sequence number 6, the timer reaches time-out so that the deciding unit 45 instructs switching the reception line to another line to the selector 6. By providing the timer corresponding to the reception line, it is possible to easily detect the missing data frames corresponding to the reception line.

Figure 24:
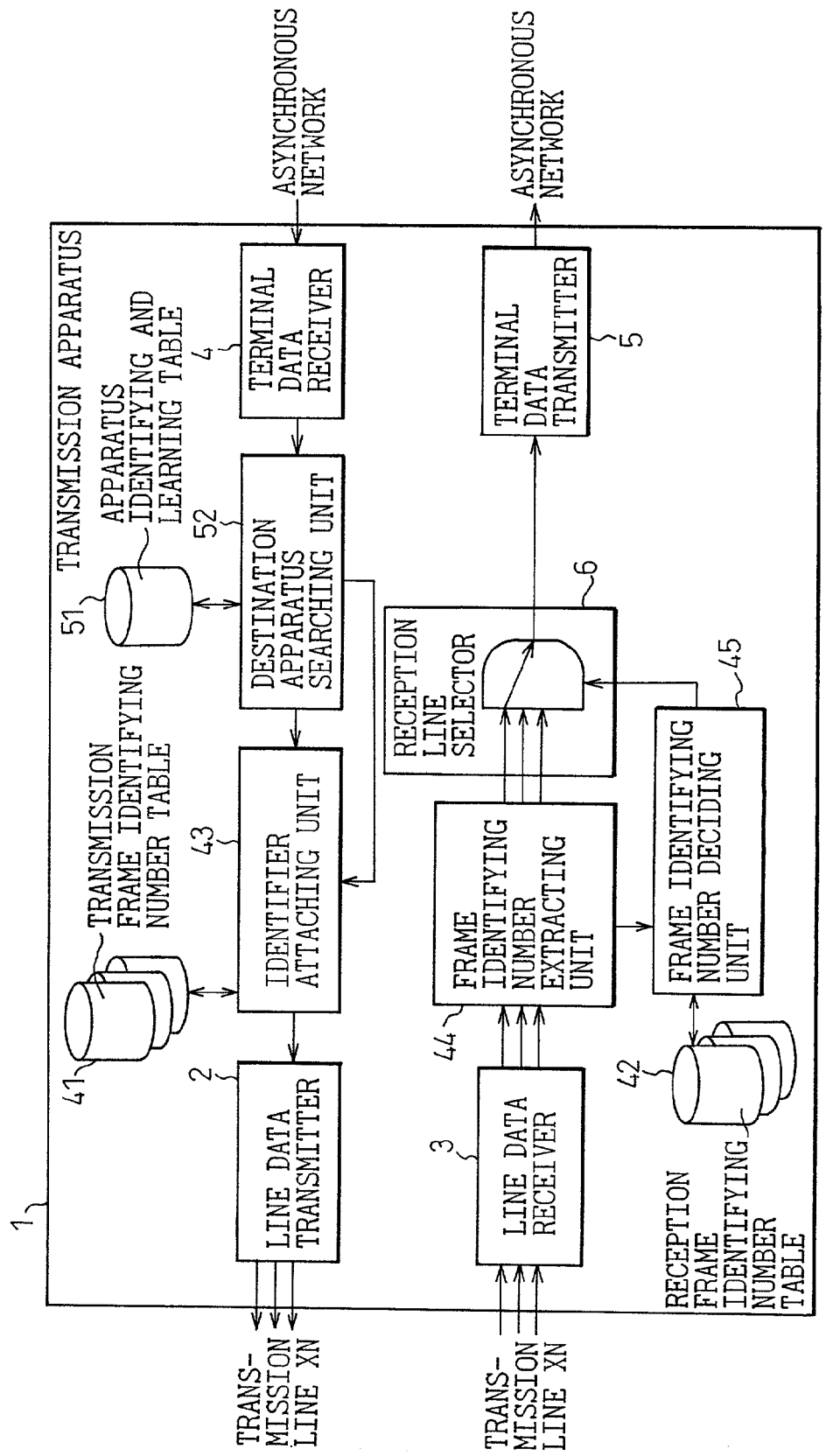
FIG. 24 is a view for explaining a sixth embodiment of the present invention.

FIG. 24 is a view for explaining a sixth embodiment of the present invention. Number 51 is an apparatus identifying and learning table, and number 52 is a destination apparatus searching unit. These are added to the structure shown in FIG. 19.

The apparatus identifying and learning table 51 has the structure shown in FIG. 11, and stores the identifying information for the apparatuses on the synchronous network and the terminal connected to the apparatus through the asynchronous network. The terminal data receiver 4 receives the data frame through the asynchronous network such as the LAN, and transfers the data frame to the destination apparatus searching unit 52. The searching unit 52 extracts the destination terminal identifying information such as the destination MAC address contained in the data frame, and searches the learning table 51. The searching unit 52 informs destination apparatus identifying information to the identifier attaching unit 43.

The identifier attaching unit 43 adds the identifier (header) to the data frame transferred from the searching unit 52, and inserts the destination apparatus identifying information, which is informed from the searching unit 52, into the identifier. Further, the identifier attaching unit 43 inserts the sequence number from the table 41, and transfers the data frame to the line data transmitter 2. The transmitter 2 transmits the synchronous data such as the SDH frame to each transmission line of the synchronous network.

Figure 25:
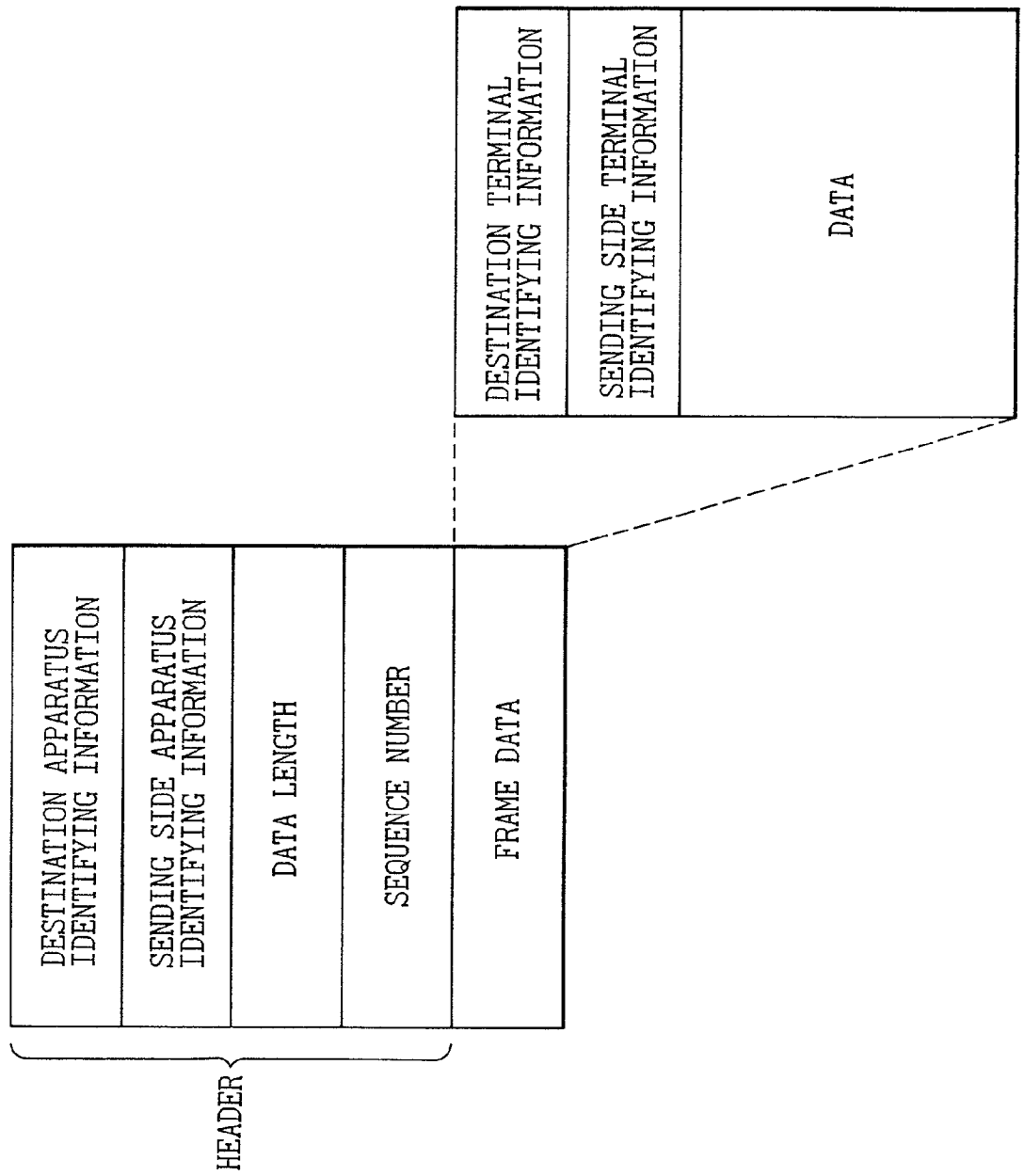
FIG. 25 is a view for explaining the frame structure.

FIG. 25 is a view for explaining the frame structure. The identifier attaching unit 43 transfers the data to the line data transmitter 2. The header includes the destination apparatus identifying information from the searching unit 52, the sending side apparatus identifying information, the data length and the sequence number from the table 41. The frame data includes the destination terminal identifying information such as the destination MAC address, the sending side terminal identifying information such as the sending side MAC address, and the data transmitted and received between terminals.

FIG. 26A is a view for explaining the transmission frame identifying number table, and FIG. 26B is a view for explaining the reception frame identifying number table. In FIG. 26A, the transmission frame identifying number table 41 includes the transmission sequence numbers corresponding to each of destination transmission apparatuses 1 to n, and the sequence number corresponding to the broadcast. The sequence number is sequentially incremented. The identifier attaching unit 43 executes the process in which the present sequence number is incremented by +1, and the incremented sequence number is used as the next sequence number.

In FIG. 26B, the reception frame identifying number table 42 includes the reception sequence numbers corresponding to each of sending side transmission apparatuses 1 to n. Each reception sequence number includes the reception sequence numbers corresponding to each of reception lines 1 to n for its own apparatus and reception lines 1 to m for the broadcast.

The line data receiver 3 receives the synchronous data such as the SDH frame transmitted from plural transmission lines, and converts synchronous data to asynchronous data and transfers the data frame to the reception line selector 6 through the frame identifying number extracting unit 44. The extracting unit 44 extracts the sequence number inserted in the header and passes it to the deciding unit 45, and transfers the data frame, in which the header is deleted, to the selector 6.

The deciding unit 45 compares the sending side identifying information stored in the table 42 and the just previous reception sequence number corresponding to the reception line with the present reception sequence number, and determines whether the reception line is normal. Further, deciding unit 45 updates the reception sequence number stored in the table 42 to the present reception sequence number.

Figure 27:
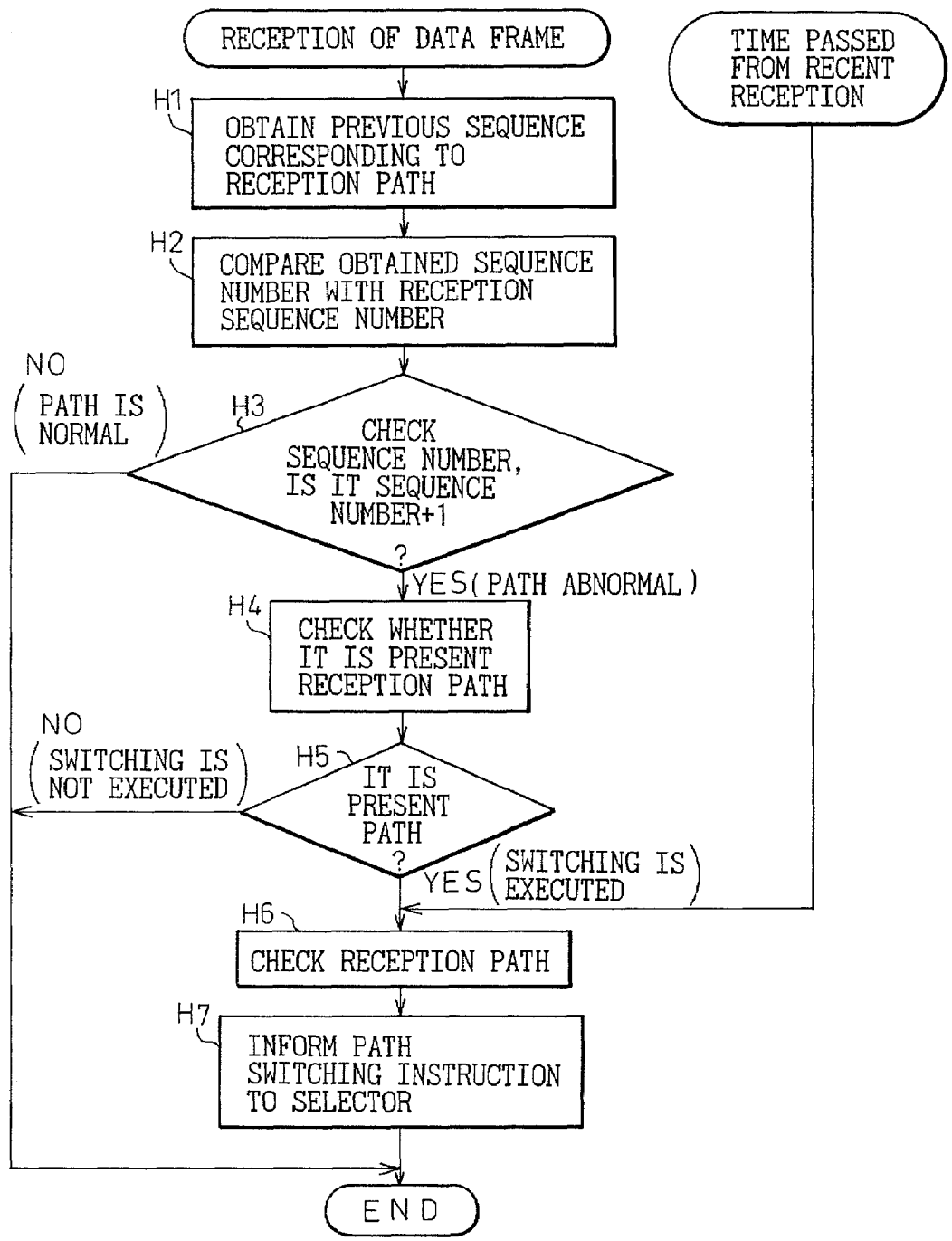
FIG. 27 is a flowchart for determination of the sequence number.

FIG. 27 is a flowchart for determination of the sequence number. The frame identifying number extracting unit 44 extracts the sending side apparatus identifying information and the sequence number from the header, and informs the reception line of the sequence number to the deciding unit 45. The deciding unit 45 searches the table 42 based on the information of the sending side apparatus and the reception line, and obtains the just previous sequence number (H1).

The deciding unit 45 compares the just previous sequence number with the present reception sequence number (H2), and determines whether the present sequence number is incremented by +1 from the just previous sequence number (H3). When the sequence number is incremented by +1, the deciding unit 45 determines the reception line as being normal. On the other hand, when the sequence number is not incremented by +1, the deciding unit 45 determines the reception line as being abnormal. Further, the deciding unit 45 checks whether the abnormal line is the line currently selected by the selector 6 (H4). Further, the deciding unit 45 determines whether it is the present line or not (H5). When it is not the present line, the deciding unit completes the process. When it is the present reception line, the deciding unit 45 determines the selectable reception line (H6), and informs switching the reception line to another line to the selector 6 (H7).

Further, the deciding unit 45 includes the timer means corresponding to the reception line. When the predetermined time is passed for the predetermined time from the reception time of the data frame, the deciding unit 45 determines occurrence of the line failure on the reception line, determines selectable reception line from plural reception lines (H6), and instructs switching of the reception line to another line (H7). Accordingly, if the sequence numbers are not continued, or if the data frame is not received after passing of the predetermined time, the deciding unit 45 determines as the reception line being abnormal, and instructs switching of the reception line to another normal line.

Accordingly, each transmission apparatus checks the normality of plural reception lines of the synchronous network. When the apparatus detects occurrence of failure, the apparatus switches the failure line to the normal line. According to the present invention, it is possible to quickly detect the line failure of the synchronous network having the redundant structure, and to transmit the asynchronous data through the asynchronous network after conversion the synchronous data received from the normal line to the asynchronous data such as the MAC frame.

The present invention is not limited in the scope of the above-mentioned embodiments, and can be realized in the various modifications. For example, although conversion of the MAC frame to the SDH frame was executed using an IT frame and an IT cell, it is possible to utilize another means.

What is claimed is:

1. A plurality of transmission apparatuses each of which functions as a sending side transmission apparatus and a destination transmission apparatus; each of said plural transmission apparatuses being connected to terminals through an asynchronous network; said plural transmission apparatuses being interconnected through plural transmission lines each formed by a synchronous network; asynchronous data from one of said terminals being transmitted from said sending side transmission apparatus to said plural transmission lines after simultaneous conversion from said asynchronous data to synchronous data; said destination transmission apparatus selecting one of plural reception lines of said synchronous network; and said destination transmission apparatus converting said synchronous data to said asynchronous data and transmitting said asynchronous data to one of terminals through said asynchronous network; each of said transmission apparatuses comprising:

a means for selecting one of reception lines each formed by said synchronous network;

a means for transmitting a communication confirming frame to said synchronous network at least at a predetermined period;

a communication confirming table for storing each reception time of said communication confirming frame received through said synchronous network, corresponding to each of said reception lines; and a means for deciding occurrence of failure on said reception line corresponding to said reception time when a difference between a reception time stored in said table and a present time at said predetermined period exceeds a predetermined value, and transmitting instructions of switching said reception line to said reception line selecting means.

2. A plurality of transmission apparatuses each of which functions as a sending side transmission apparatus and a destination transmission apparatus; each of said plural transmission apparatuses being connected to terminals through an asynchronous network; said plural transmission apparatuses being interconnected through plural transmission lines each formed by a synchronous network; asynchronous data from one of said terminals being transmitted from said sending side transmission apparatus to said plural transmission lines after simultaneous conversion from said asynchronous data to synchronous data; said destination transmission apparatus selecting one of plural reception lines of said synchronous network; and said destination transmission apparatus converting said synchronous data to said asynchronous data and transmitting said asynchronous data to one of terminals through said asynchronous network; each of said transmission apparatuses comprising:

a terminal identifying and learning table for extracting a sending side terminal identifying information of said asynchronous data from said terminal, and for storing extracted said sending side terminal identifying information with a reception time of said extracted sending side terminal identifying information;

a means for transmitting contents of said terminal identifying and learning table to all transmission apparatuses connected to said synchronous network using said terminal identifying and informing frame; and a transmission apparatus identifying and learning table for storing said terminal identifying information of the contents of said terminal identifying and informing frame received from said synchronous network, corresponding to said sending side transmission apparatus of said terminal identifying and informing frame, and for learning terminal identifying information connected to each transmission apparatus.

3. A transmission apparatus as claimed in claim 2, further comprising:

a means for transmitting said terminal identifying and informing frame to said synchronous network at least at a predetermined period;

a communication confirming table for storing a reception time corresponding to each of said reception lines of said terminal identifying and informing frame received through said synchronous network; and a means for deciding occurrence of failure on said reception line corresponding to said reception time when a difference between a reception time stored in said table and a present time at said predetermined period exceeds a predetermined value, and transmitting instructions of switching said reception line to said reception line selecting means.

4. A method for transmitting data in a data transmission system which is structured by a plurality of transmission apparatuses each of which functions as a sending side transmission apparatus and a destination transmission apparatus; each of said plural transmission apparatuses being connected to terminals through an asynchronous network; said plural transmission apparatuses being interconnected through plural transmission lines each formed by a synchronous network; asynchronous data from one of said terminals being transmitted from said sending side transmission apparatus to said plural transmission lines after simultaneous conversion from said asynchronous data to synchronous data; said destination transmission apparatus selecting one of plural reception lines of said synchronous network; and said destination transmission apparatus converting said synchronous data to said asynchronous data and transmitting said asynchronous data to one of terminals through said asynchronous network; said method comprising steps of:

transmitting a communication confirming frame from one of said transmission apparatus to said synchronous network at least at a predetermined period;

storing a reception time of said communication confirming frame corresponding to said reception line in said transmission apparatus which received said communication confirming frame;

comparing a reception time of said communication confirming frame stored in said table at a predetermined period and corresponding to said reception line, with a present time; and deciding occurrence of failure on said reception line corresponding to said reception time when a difference between said reception time and said present time exceeds a predetermined value, and controlling a reception line selecting means so as to select a normal reception line.

5. A method for transmitting data in a data transmission system which is structured by a plurality of transmission apparatuses each of which functions as a sending side transmission apparatus and a destination transmission apparatus; each of said plural transmission apparatuses being connected to terminals through an asynchronous network; said plural transmission apparatuses being interconnected through plural transmission lines each formed by a synchronous network; asynchronous data from one of said terminals being transmitted from said sending side transmission apparatus to said plural transmission lines after simultaneous conversion from said asynchronous data to synchronous data; said destination transmission apparatus selecting one of plural reception lines of said synchronous network; and said destination transmission apparatus converting said synchronous data to said asynchronous data and transmitting said asynchronous data to one of terminals through said asynchronous network; said method comprising steps of:

extracting sending side terminal identifying information of said asynchronous data from one of said terminal, and storing extracted said information in a terminal identifying and learning table;

transmitting contents of said terminal identifying and learning table to all transmission apparatuses connected to said synchronous network using a terminal identifying and informing frame;

storing said terminal identifying information of the contents of said terminal identifying and informing frame received through said synchronous network in a transmission apparatus identifying and learning table, corresponding to said sending side transmission apparatus of said terminal identifying and informing frame; and adding a destination apparatus identifying information based on said identifying information of said terminal referring to said learning table, to said asynchronous data from said terminal through said asynchronous network, and transmitting said destination apparatus identifying information to said synchronous network.

* * * * *